United States Patent [19]
Mekanik et al.

[11] Patent Number: 5,739,595
[45] Date of Patent: Apr. 14, 1998

[54] APPARATUS AND METHODS FOR GENERATING AN AC POWER SIGNAL FOR CABLE TV DISTRIBUTION SYSTEMS

[75] Inventors: Fereydoun Mekanik, Bellingham; Brian M. Kennedy, Everson; Thomas S. Osterman, Bainbridge Island, all of Wash.

[73] Assignee: Alpha Technologies, Inc., Bellingham, Wash.

[21] Appl. No.: 610,141

[22] Filed: Feb. 29, 1996

Related U.S. Application Data

[63] Continuation of Ser. No. 116,012, Sep. 2, 1993, abandoned, which is a continuation-in-part of Ser. No. 967,773, Oct. 28, 1992, Pat. No. 5,410,720.

[51] Int. Cl.⁶ ...................................................... H02J 7/00
[52] U.S. Cl. .............................. 307/64; 307/43; 307/87
[58] Field of Search ................................. 307/43, 44, 64, 307/66, 80, 85, 86, 87

[56] References Cited

U.S. PATENT DOCUMENTS

| | | | |
|---|---|---|---|
| 1,718,238 | 6/1929 | Kettering et al. | 290/35 |
| 2,007,415 | 7/1935 | Walker | 315/87 |
| 2,014,101 | 9/1935 | Bryan | 290/7 |
| 2,037,183 | 4/1936 | Strieby | 370/26 |
| 2,063,994 | 12/1936 | Frank et al. | 290/30 A |
| 2,085,072 | 6/1937 | Bobe | 290/30 R |
| 2,165,969 | 7/1939 | Humbert et al. | 290/30 R |
| 2,240,123 | 4/1941 | Shoup et al. | 455/298 |
| 2,302,192 | 11/1942 | Dannheiser | 307/64 |
| 2,427,678 | 9/1947 | Laging | 290/30 R |
| 2,688,704 | 9/1954 | Christenson | 290/4 C |
| 2,856,543 | 10/1958 | Dixon et al. | 290/30 A |
| 2,920,211 | 1/1960 | Gotoh | 290/30 A |
| 3,064,195 | 11/1962 | Freen | 455/3.3 |
| 3,221,172 | 11/1965 | Rolison | 290/4 R |
| 3,283,165 | 11/1966 | Bloch | 290/4 R |
| 3,293,445 | 12/1966 | Levy | 307/66 |
| 3,305,762 | 2/1967 | Geib, Jr. | 322/4 |
| 3,339,080 | 8/1967 | Howald | 307/66 |
| 3,345,517 | 10/1967 | Smith | 290/4 R |
| 3,348,060 | 10/1967 | Jamieson | 307/66 |
| 3,435,358 | 3/1969 | Rheinfelder | 330/297 |
| 3,458,710 | 7/1969 | Dodge | 290/4 R |
| 3,525,035 | 8/1970 | Kakalec | 323/248 |
| 3,525,078 | 8/1970 | Baggott | 340/310.02 |
| 3,636,368 | 1/1972 | Sia | 307/64 |

(List continued on next page.)

FOREIGN PATENT DOCUMENTS

| | | |
|---|---|---|
| 2005118 | 4/1979 | United Kingdom. |
| 2137033 | 9/1984 | United Kingdom. |
| 2171861 | 9/1986 | United Kingdom. |
| WO 85/01842 | 4/1985 | WIPO. |

*Primary Examiner*—Richard T. Elms
*Assistant Examiner*—Jonathan Kaplan
*Attorney, Agent, or Firm*—Michael R. Schacht; Hughes, Multer & Schacht, P.S.

[57] ABSTRACT

A cable TV distribution system in which an AC power signal is generated according to the following steps: (a) generating an AC power signal having at least a positive half-cycle, where the positive half-cycle comprises a rising portion, a falling portion, and a central portion; and (b) limiting the slew rate of the AC power signal within the rising portion to a range of 30 V/ms and 50 V/ms inclusive. Preferably, the slew rate of the AC power signal within the falling portion is limited to the range of −30 V/ms and −50 V/ms inclusive. The AC power signal is preferably generated by a power supply comprising: (a) a ferroresonant transformer; (b) a ferro-capacitor connected across the first and second terminals of the output windings of the ferroresonant transformer; (c) an inductor connected across the first and second terminals in parallel with the ferro-capacitor; (d) a switch for preventing current flow through the inductor in response to a switch control signal; and (e) a control circuit for generating the switch control signal to obtain the desired AC power signal.

30 Claims, 19 Drawing Sheets

U.S. PATENT DOCUMENTS

| | | | |
|---|---|---|---|
| 3,678,284 | 7/1972 | Peters | 290/1 R |
| 3,691,393 | 9/1972 | Papachristou | 290/30 R |
| 3,859,589 | 1/1975 | Rush | 322/40 |
| 3,943,447 | 3/1976 | Shomo, III | 455/3.3 |
| 4,170,761 | 10/1979 | Koppehele | 330/166 |
| 4,366,390 | 12/1982 | Rathmann | 307/66 |
| 4,460,834 | 7/1984 | Gottfried | 307/64 |
| 4,475,047 | 10/1984 | Ebert, Jr. | 307/66 |
| 4,510,401 | 4/1985 | Legoult | 307/66 |
| 4,686,375 | 8/1987 | Gottfried | 290/2 |
| 4,719,550 | 1/1988 | Powell et al. | 307/46 |
| 4,745,299 | 5/1988 | Eng et al. | 307/66 |
| 4,748,342 | 5/1988 | Dijkmars | 307/66 |
| 4,763,014 | 8/1988 | Model et al. | 307/66 |
| 4,916,329 | 4/1990 | Dang et al. | 307/66 |
| 5,010,469 | 4/1991 | Bobry | 363/37 |
| 5,029,285 | 7/1991 | Bobry | 307/64 |
| 5,057,698 | 10/1991 | Widener et al. | 307/66 |
| 5,172,009 | 12/1992 | Mohan | 307/46 |
| 5,185,536 | 2/1993 | Johnson, Jr. et al. | 307/66 |
| 5,198,698 | 3/1993 | Paul et al. | 307/64 |
| 5,198,970 | 3/1993 | Kawabata et al. | 363/37 |
| 5,237,208 | 8/1993 | Tominaga et al. | 307/66 |
| 5,302,858 | 4/1994 | Folts | 307/66 |

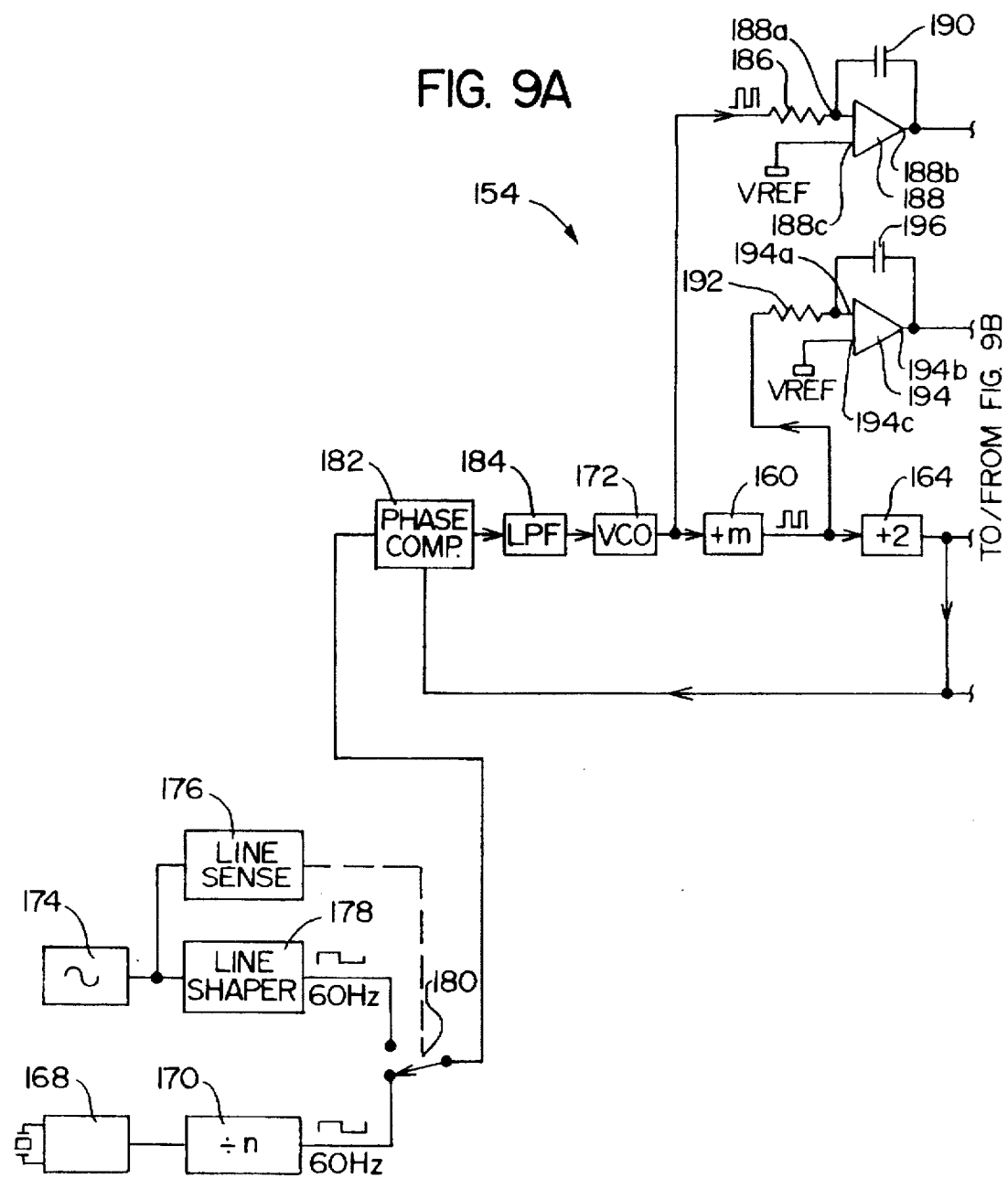

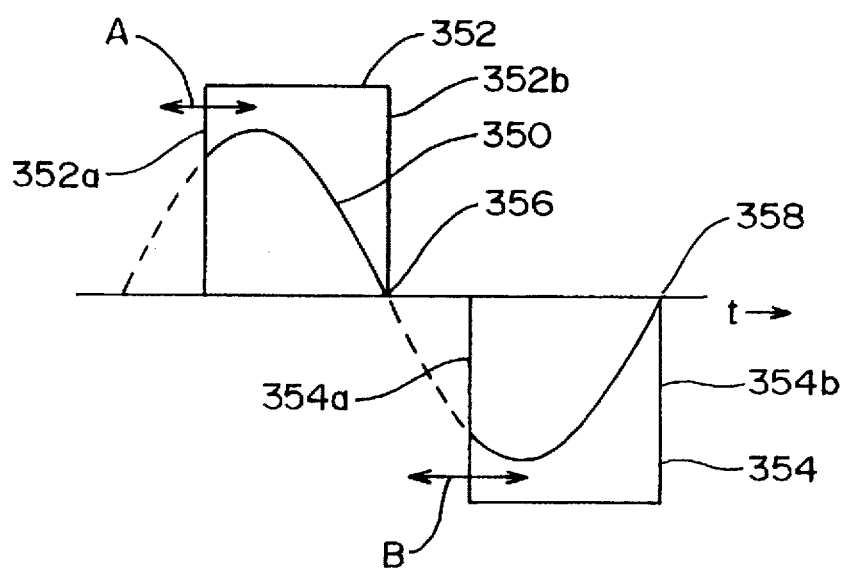

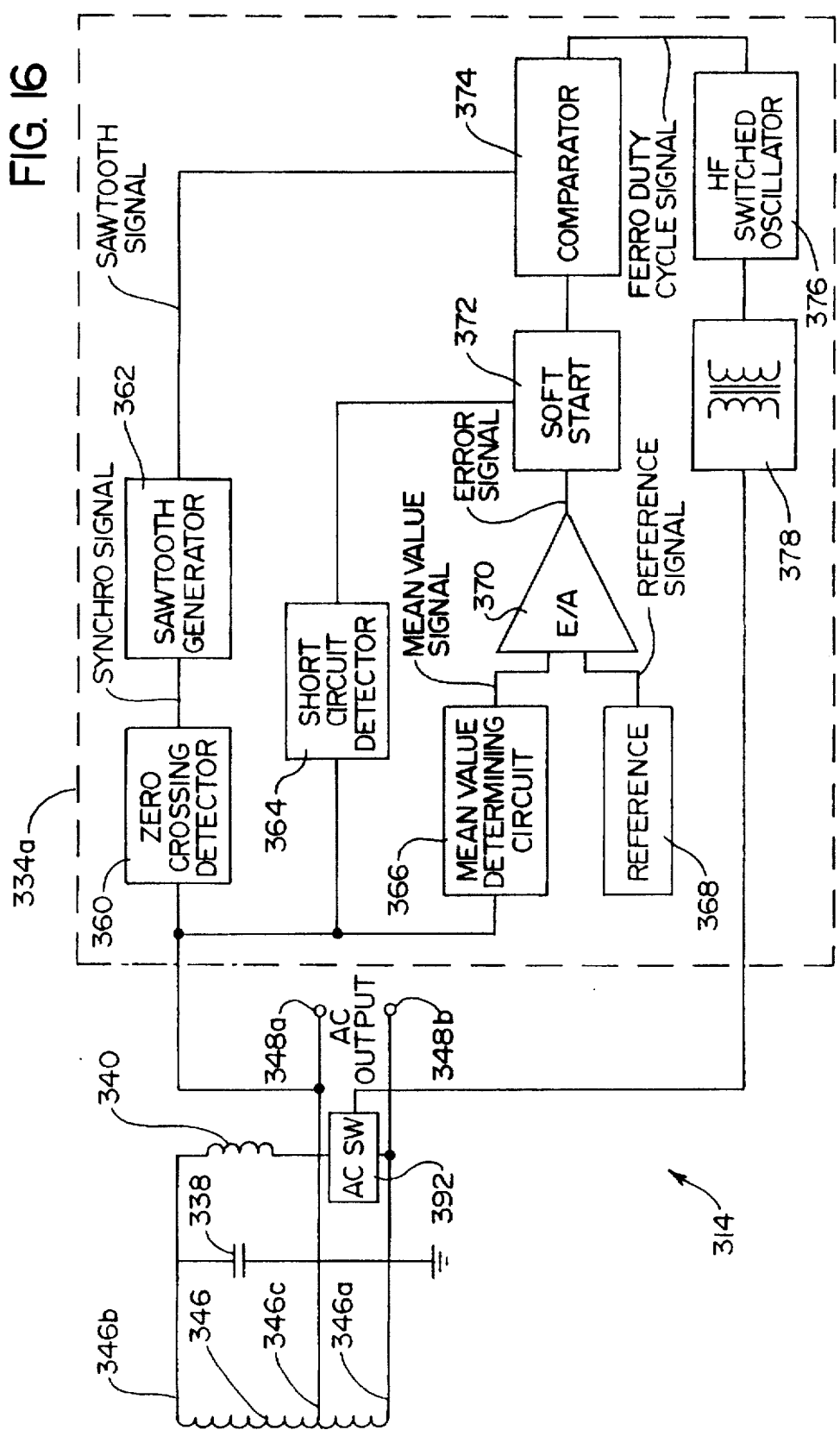

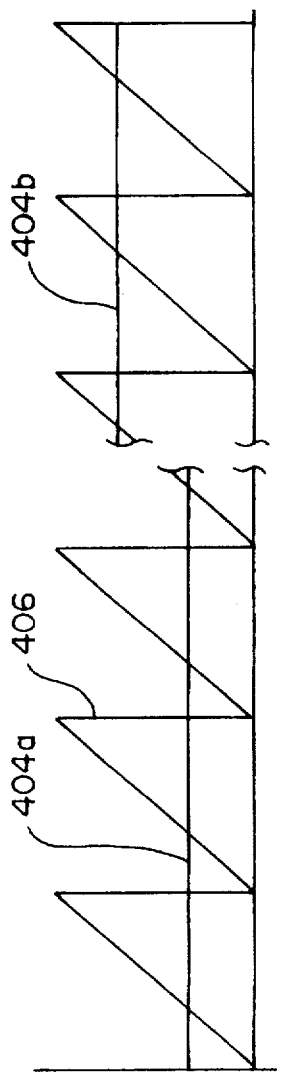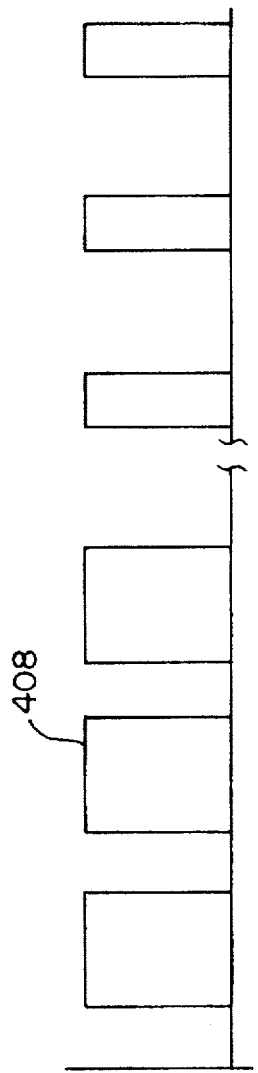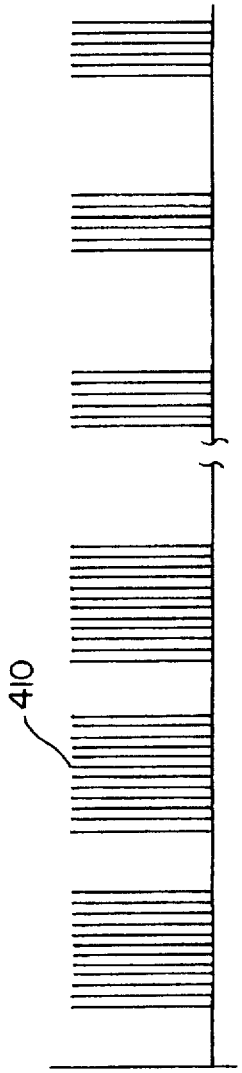

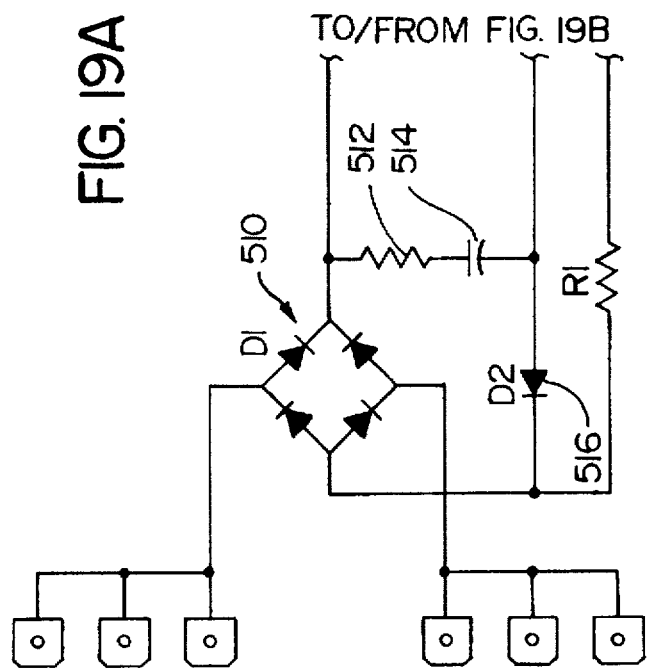

APPARATUS AND METHODS FOR GENERATING AN AC POWER SIGNAL FOR CABLE TV DISTRIBUTION SYSTEMS

RELATED APPLICATIONS

This is a continuation application of Ser. No. 08/116,012 filed Sept. 2, 1993, now abandoned which is a continuation-in-part application of Ser. No. 07/967,773 filed Oct. 28, 1992, now U.S. Pat. No. 5,410,720.

TECHNICAL FIELD

The present invention relates to cable systems for distributing television (TV) signals, and, more particularly, to apparatus and methods for so generating power signals used in such cables systems that interference with the TV signal distributed thereby is reduced.

BACKGROUND OF THE INVENTION

In a cable TV system, a distribution system is used to carry a cable TV signal from an origination point, referred to as a "headend", to a television at the subscriber's premises. An exemplary cable TV distribution system is depicted at 10 in FIG. 1. A headend of the cable system 10 is indicated at 12 and typical subscribers' premises are indicated at 14. The headend 12 combines separate information carrying signals into an RF cable TV signal. A television set (not shown) at the subscribers' premises 14 selects one of the information carrying signals from the cable TV signal, decodes this signal, and displays the decoded information to a subscriber.

As shown in FIG. 1, the information carrying signals that are combined to form the cable TV signal may be supplied to the headend 12 by such sources as a satellite receiver 16, a point-to-point microwave receiver 18, a video tape player 20, or a studio 22.

A system for distributing the cable TV signal from the headend 12 to the subscribers' premises 14 is indicated at 24 in the drawing. This cable system 24 basically comprises a trunking system 26 and a distribution system 28.

The trunking system 26 is designed to conduct the cable TV signal from the headend 12 to the distribution portion 28. Three common methods of implementing such a trunking portion 26 are a coaxial cable trunking system, a point-to-point microwave trunking system, or a fiber optic cable trunking system. The details of the these trunking systems are not per se part of the invention and will not be discussed in further detail below.

The cable TV signal is carried over coaxial cables once it arrives at the distribution system 28. The distribution system 28 generally comprises: (a) a series of main coaxial cables 30; (b) one or more amplifiers 32 referred to as line extenders located in the series of main coaxial cables 30; (c) one or more power supplies 34; (d) a power inserter 36 for each of the power supplies 34; (e) one or more drop coaxial cables 38; (f) one or more taps 38; and (g) low capacity coaxial drop cable 40 extending between each tap 38 and the subscribers' premises 14 associated therewith.

The line extenders 32 are employed to maintain signal strength as the cable TV signal is distributed over the main coaxial cables 30. These line extenders 32 obtain power from an AC power signal generated by the power supplies 34 and introduced into the main coaxial cables 30 through the power inserters 36. The main coaxial cables 30 branch off to feed the taps 38.

The problem addressed by the present invention is caused by an interaction between the AC power signal generated by the power supplies 34 and the components within the taps 38. Accordingly, to understand the nature of this interference problem, the details of construction and operation of currently available power supplies 34 and taps 38 will now be described in further detail.

The power supplies 34 are designed to operate in two modes of operation: (a) a line mode in which power is supplied through utility power lines; and (b) a standby mode in which power is supplied by a battery or series of batteries. A simplified block diagram of an exemplary "split module" power supply 34 is depicted in FIG. 2. Split module power supplies such as that shown in FIG. 2 are well-known and currently available on the market from several different sources.

The power supply 34 basically comprises an AC module 42, an inverter module 44, a battery 45, a connection 46 to line voltage, a line sensing circuit 48, and a transfer relay 50. The power supply 34 operates in the following manner. During normal operation, the AC module 42 generates a line AC power signal from the line voltage; in such normal operation, the transfer relay 50 is arranged to allow this line AC power signal to pass to an output terminal 51. When the line sensing circuit 48 determines that a fault exists in the line voltage, the line sensing circuit 48 sends a signal to the inverter module 44 to begin generating a standby AC power signal. The sensing circuit 48 also sends a signal to the transfer relay 50 to connect the inverter module 44, rather than the AC module 44, to the output terminal 51.

The operation and construction of the AC module 42, which basically comprises a ferroresonant transformer and an output capacitor, is well-known, is not directly relevant to the present invention, and thus will not be discussed in further detail.

A typical inverter circuit comprising the elements of the inverter module 44 and the battery 45 of the known power supply 34 is shown at 52 in FIG. 3. Basically, this inverter circuit 52 comprises a frequency source 54, an inverting element 56, a latch element 57, first and second drive circuits 58 an 60, first and second switching transistors 62 and 64, a latching element 66, and a linear transformer 68. The transformer 68 has first and second windings 70 and 72. A positive terminal 74 of the battery 45 is connected to a center tap 76 of the first winding 70; a negative terminal 78 of the battery 45 is connected to ground.

The first and second switching transistors 62 and 64 are connected at their bases to the first and second drive circuits 58 and 60, respectively. The emitters of these transistors 62 and 64 are connected to ground, while the collectors thereof are connected to opposite ends of the first winding 70.

The ends of the second winding 72 are connected to output terminals 78 and 80.

This inverter circuit 52 operates in the following basic manner. The frequency source generates a 60 Hz square wave. This square wave is applied to the first drive circuit 58 and the inverting element 56. The inverting element 56 generates an inverted square wave that is applied to the second drive circuit 60. The latch element 66, in response to a signal generated by the line sensing circuit 48, allows the square wave and its inverted counterpart to reach the first and second drive circuits 58 and 60 when the line sensing circuit 48 senses a fault in the output of the AC module 42.

In response to the square waves, the first and second drive circuits provide an appropriate voltage to the bases of the switching transistors 62 and 64 to turn these transistors on when the square waves are high. Further, because the square wave inputs to the first and second drive circuits are inverted from each other, the switching transistor 62 is "ON" when the switching transistor 64 is "OFF", and vice versa.

When either of the transistors 62 and 64 is "ON", current flows from positive terminal 74 of the battery 45, through the transformer center tap 76, out the appropriate end of the transformer first winding 70, through the "ON" transistor, and to ground (battery negative terminal 78).

The transformer 68 is a linear transformer. Therefore, for a battery 45 having a DC voltage $V_B$, the above-described system generates at the output terminals 80 and 82 the standby AC power signal. The standby AC power signal is a square wave signal having a peak voltage of approximately $V_B$.

This square wave standby AC power signal has heretofore been considered desirable for at least two reasons. First, the inverter module 44 operates most efficiently when generating such a square wave. Specifically, the switching transistors 62 and 64 operate most efficiently when they are either "ON" or "OFF". When they are "ON", they act like a short circuit, and thus very little energy is dissipated therein. When they are "OFF", they act like an open circuit, allowing substantially no current to pass therethrough and thus consuming very little or no power. The square wave AC power signal requires these transistors to be switched quickly between "ON" or the "OFF", thus spending most of the time in their most efficient states.

The second reason such a square wave AC power signal is considered desirable is because, as is well-known in the art, the line extenders 32 can efficiently convert such a square wave signal into a DC power signal.

Referring now to FIG. 4, shown therein is a schematic of a typical tap 38. A typical tap 64 basically comprises a power passing choke 84, a coupling transformer 86, and first and second RF coupling capacitors 88 and 90. The first capacitor 88 and coupling transformer 86 filter out the AC power signal generated upstream by the power supplies 34 and reduce the voltage of the RF cable TV signal to a level appropriate for the subscriber's television. The drop cables 40 extend from the output of the coupling transformer 86 to the subscriber's premise 14. The choke 84 and second RF coupling capacitor 90 allow the RF cable TV signal and the AC power signal to pass through the tap 38.

A primary function of the tap 38 is to allow the cable TV signal to be dropped to a number of subscriber's premises from a single point on the distribution cable 30. Other important functions of these taps 64 are to: (a) reduce the voltage level of the signals entering the subscribers' premises 14; and (b) isolate the low capacity coaxial drop cables 40 feeding the subscribers' residences 14 from the distribution coaxial cables 30.

The AC power signal generated by the inverter circuit 52 described above has been found to cause the taps 38 to generate an interference signal that interferes with the cable TV signal entering the subscriber's premises through the drop cable 40.

The interference signal has been attributed at least in part to the inverter circuit 52 because this interference has been found to be more likely to occur when the power supply is in standby mode; this interference problem is much less likely to occur when the AC power signal is being generated by the AC module 42 connected to the line voltage.

Also, it has been discovered that this interference problem is much mores severe: (a) for a given range of values chosen for the capacitors employed in the taps; and (b) when large numbers of taps are attached in series to a single power supply. Accordingly, the taps are also believed to be responsible for this interference problem.

An example of lines in the television picture caused by the above-described interference signal is depicted in FIG. 5.

Several steps may be taken to alleviate to some extent the interference problem solved by the present invention.

As one option, the capacitance values of the capacitors within the taps may be reduced. Previously, in an attempt to increase the bandwidth of the signal that may pass through the taps, at least one tap manufacturer has increased the values of the capacitors within the taps. The taps with such increased capacitor values are more susceptible to the interference problem described above. Accordingly, the problem may be alleviated to some extent by providing capacitors in the taps with smaller capacitance values.

However, it is generally desirable, in order to allow increased bandwidth of the signal that may be passed through the taps, not to rely on these smaller capacitance values to solve the interference problem addressed by the present invention. Further, given the number of taps currently installed, it is not economical to change the taps or the capacitors within these taps at this time.

As a second option, the number of taps in the line downstream from each power supply may be reduced. Placing a large number of taps in series downstream of a given power supply increases the voltage spikes occurring towards the end of the line. This is because the signal is passed through the differentiating circuits formed in a number of successive taps, with the peak of the voltage spikes being increased by each tap. Theoretically, the present problem may thus be alleviated by decreasing the number of taps connected in the line downstream of each power supply by increasing the number of power supplies.

However, it is not practical in a cable TV system to decrease the number of taps in this manner because to do so would require the purchase and installation of a large number of relatively costly power supplies.

PRIOR ART

It has been proposed that the above described problem may be solved or reduced by replacing the linear transformer employed in the circuit 52 with a ferroresonant transformer. A ferroresonant transformer is not linear and thus does not pass the very square wave yielded by a linear transformer. However, this approach is expensive and requires substantial modification of the inverter module.

OBJECTS OF THE INVENTION

It should be clear from the foregoing that a major object of the present invention is to provide an AC power signal that does not cause interference with the cable TV signal in a cable TV distribution system.

Another important, but more specific, object of the present invention is to provide apparatus and methods for generating AC power signals that have desirable combination of the following characteristics:

a. requires only minor modification of the prior art inverter module to solve the tap saturation problem;

b. efficient operation;

c. does not require modification of the taps;

d. inexpensive to implement;

e. allows modification of prior art ferroresonant transformers to solve tap saturation; and f. when used with a switched inverter module, operates high power switching transistors primarily in their most efficient "OFF" or "ON" conditions.

SUMMARY OF THE INVENTION

In copending U.S. patent application Ser. No. 07/967,773, the Applicant recognized that the steeply rising AC power signal generated by prior art power supplies in standby or inverter mode can cause the interference problem discussed above. Specifically, the RF coupling capacitor 88 and transformer winding 92 form an integrator circuit that generates a voltage spike for each leading and trailing edge of each half-cycle of the AC power signal. These brief voltage spikes saturate the taps and prevent passage of the cable TV signal twice during each cycle of the AC power signal.

In the '773 application, the Applicant thus proposed that these leading and trailing edges must be shaped in a manner that eliminates this saturation of the taps. Specifically, the Applicant disclosed generating an AC power signal having at least a positive half-cycle, where the positive half-cycle comprises a rising portion, a falling portion, and a central portion. The slew rate of the AC power signal within the rising portion should be limited in the environment of the cable TV distribution system to a range of 30 V/ms to 50 V/ms inclusive. Preferably, the slew rate of the AC power signal within the falling portion is limited to the range of −30 V/ms and −50 V/ms inclusive. This method results in a waveform that does not cause saturation of the taps under normal circumstances.

The AC power signal disclosed in the '773 application may alternatively be defined as an AC power signal having at least a positive half-cycle, where the positive half-cycle comprises a rising portion, a falling portion, and a central portion that is relatively flat in comparison to the rising portion. Within the rising portion, the AC power signal is so limited that the AC power signal remains within a range inclusively defined by (a) a first line segment extending between a first point at the beginning of the rising portion and a second point at the end of the rising portion, and (b) a first curve segment of a first sinusoidal curve having the same period as the AC power signal, the first curve segment extending between the first and second points.

To obtain the desired AC power signal, the '773 application disclosed a power supply for generating an AC power signal for supplying power to line extending amplifiers in a cable TV distribution system. Such a power supply comprises: (a) means for generating at least a first drive signal having a first portion comprising a series of pulses, a second portion comprising a series of pulses, and a third portion comprising a single pulse; (b) means for generating at least a first pulsed power signal the timing of which corresponds to timing of the first drive signal; (c) a transformer for altering the voltage of the first pulsed power signal; and (d) means for integrating the altered first pulsed power signal to obtain the AC power signal. Such a power supply allows operation of high power switching transformers in their most efficient "ON" or "OFF" states while still yielding an AC power signal that does not cause saturation of the taps; this power supply can also be easily constructed merely by modifying one portion of the prior art inverter module.

However, the method and apparatus disclosed in the '773 application for generating the desired AC power signal were appropriate for split module power supplies having an inverter module that is switched on line when the line voltage is interrupted. Another class of power supplies, such as those manufactured by Alpha Technologies, Inc., is available on the market. These power supplies will be referred to herein as Alpha power supplies. The Alpha power supplies employ a ferroresonant transformer instead of a linear transformer when the power supply is in standby mode.

An exemplary Alpha power supply is depicted at 94 in FIG. 12. The power supply 94 comprises a control circuit 96, a battery 98, a charger/inverter circuit 100, and a ferroresonant transformer 102. AC line voltage is present at input terminals 94a of the power supply 94 and the AC power signal generated by the power supply 94 is present at output terminals 94b thereof. A control transformer 104 allows the control logic circuit 96 to monitor the AC line voltage. A line switch 106 is connected between the input terminals 94a and windings 102a of the ferroresonant transformer 102 when opened. Charger/inverter switches 108a and 108b are connected between the charger/inverter circuit 100 and a second set of windings 102b of the ferroresonant transformer 102.

The power supply 94 operates basically as follows. During normal operation, the line switch 106 is closed and the control circuit 96 operates the charger/inverter switches 108a and 108b such that the charger/inverter circuit 100 charges the battery 98. The control circuit 96 develops a signal indicative of the phase of the AC line voltage while the power supply is operating normally. When a fault in the AC line voltage occurs, the control circuit 96 detects the fault through the control transformer 104, opens the switch 106 to prevent current from flowing through the first winding 102a, and operates the switches 108a,b such that the charger/inverter circuit 100 stops charging and generates an AC standby signal across the second set of windings 102b. This results in the AC power signal discussed above across the output terminals 94b.

As is well-known in the art, ferroresonant transformers such as the exemplary transformer 102 are simple, efficient, provide good output voltage (AC power signal) regulation, suppress input noise, provide output short circuit protection, and have a good input power factor.

It is also well-known that ferroresonant transformers are not linear; that is, while the AC standby signal generated by the charger/inverter circuit 100 is normally a square wave, the AC power signal across the output terminals 94b will not be a square wave. However, as shown in FIG. 13, the output of an Alpha power supply using such a ferroresonant transformer such as the supply 94 are relatively square and thus, while not optimum, are acceptable for subsequent rectifying and filtering. In particular, indicated at 109a and 109b in FIG. 19 are waveforms of the AC power signal generated by the power supply 94 under no load and full load conditions, respectively.

As was noted in the Prior Art section above, the AC power signals generated by ferroresonant transformers alleviate to some extent the interference problems discussed above in reference to FIG. 5. However, this interference still occurs in the Alpha power supplies such as the power supply 90 described above, even though Alpha power supplies use a ferroresonant transformer in both normal and standby modes.

In one aspect, the present invention provides an apparatus that will allow Alpha power supplies to generate the AC power signals described in the '773 application, thereby substantially eliminating interference problems such as are depicted in FIG. 5.

In particular, the present invention is a power supply for CATV systems comprising a controlled ferroresonant transformer (CFR transformer). A CFR transformer comprises on its output side circuitry that simulates saturation of the ferroresonant transformer. By simulating saturation of the core, the present invention obtains the above-described benefits of a ferroresonant transformer without actual saturation of the core.

Because a CFR transformer does not require that the core of the ferroresonant transformer saturate, a number of benefits are obtained. First, the transformer is quieter and more efficient than an uncontrolled ferroresonant transformer and provides good output voltage regulation against changes in input frequency.

Importantly, the CFR transformer allows precise control of the amplitude of the output voltage waveform. In particular, a control circuit can be designed that controls the CFR transformer to maintain the amplitude of the output voltage within narrowly defined parameters, even if the voltage and frequency of the input signal are not constant. The control circuit can thus be designed such that the output of a CFR transformer used in an Alpha power supply meets the requirements of the AC power signal defined in the '773 application.

BRIEF DESCRIPTION OF THE DRAWINGS

FIG. 15 depicts the signal employed to control the AC switch depicted in FIG. 14;

FIG. 16 depicts an exemplary control circuit as depicted in FIG. 14;

FIGS. 18A–C are timing diagrams depicting certain of the signals present in the circuit depicted in FIG. 17A–C; and FIG. 19A–B depict another exemplary control circuit as depicted in FIG. 14.

DETAILED DESCRIPTION OF THE INVENTION

Figure 1:
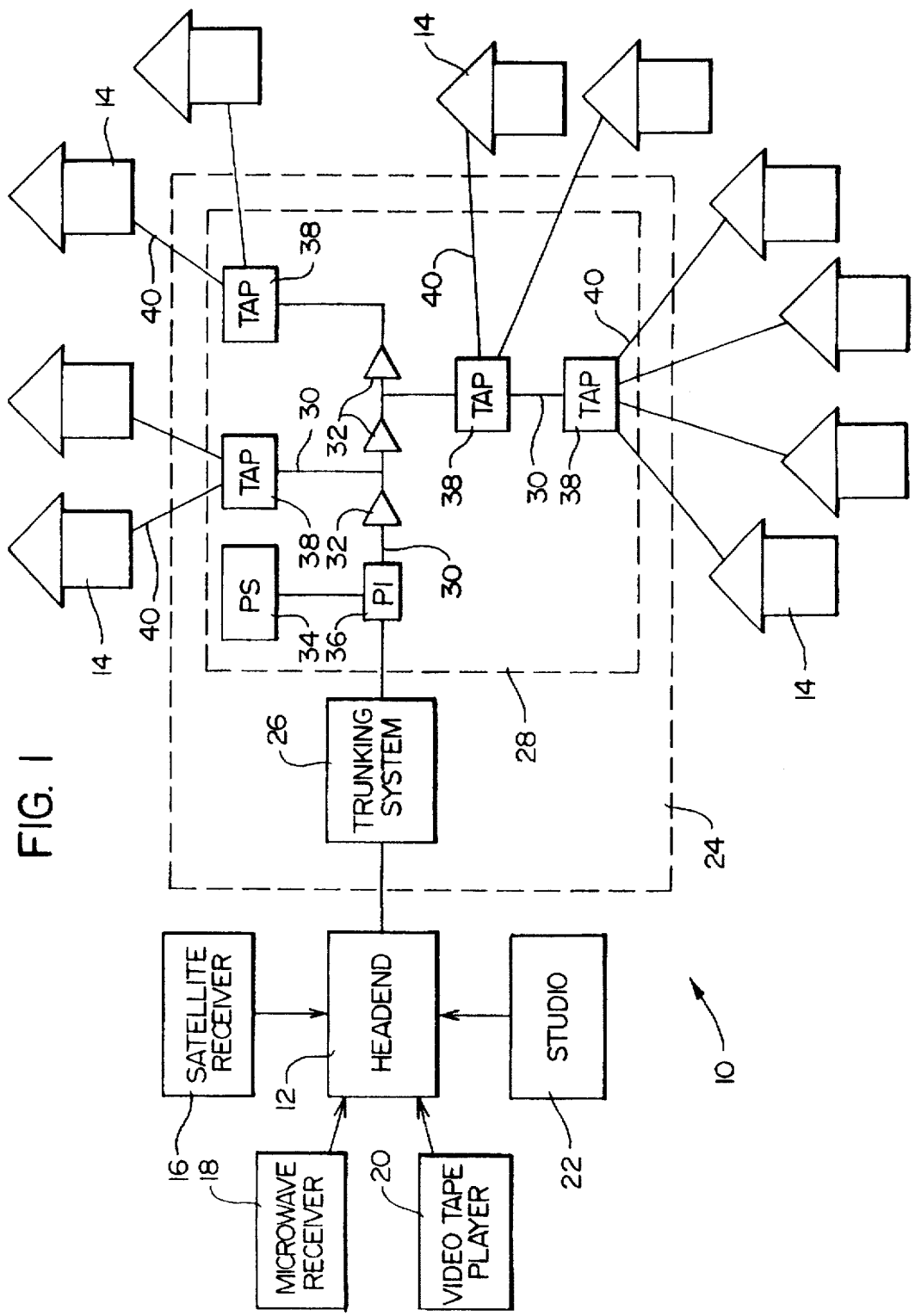
FIG. 1 is a simplified block diagram of a typical cable TV distribution system.
Figure 2:
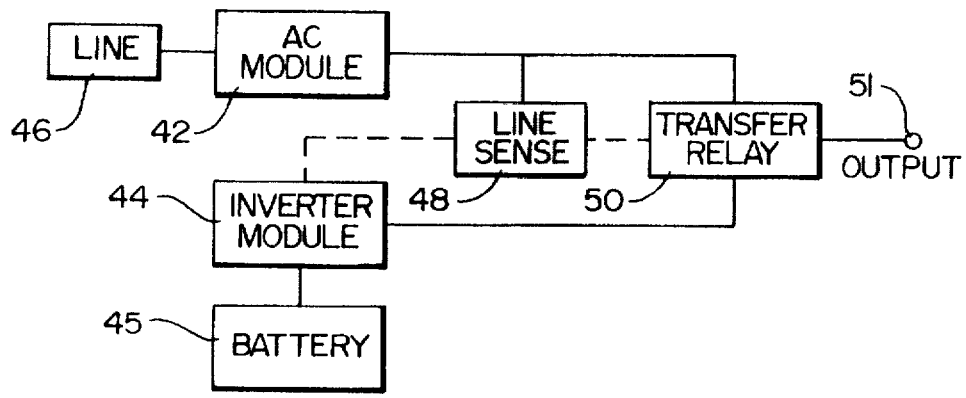
FIG. 2 schematically depicts a typical power supply as used in a cable TV distribution system.
Figure 3:
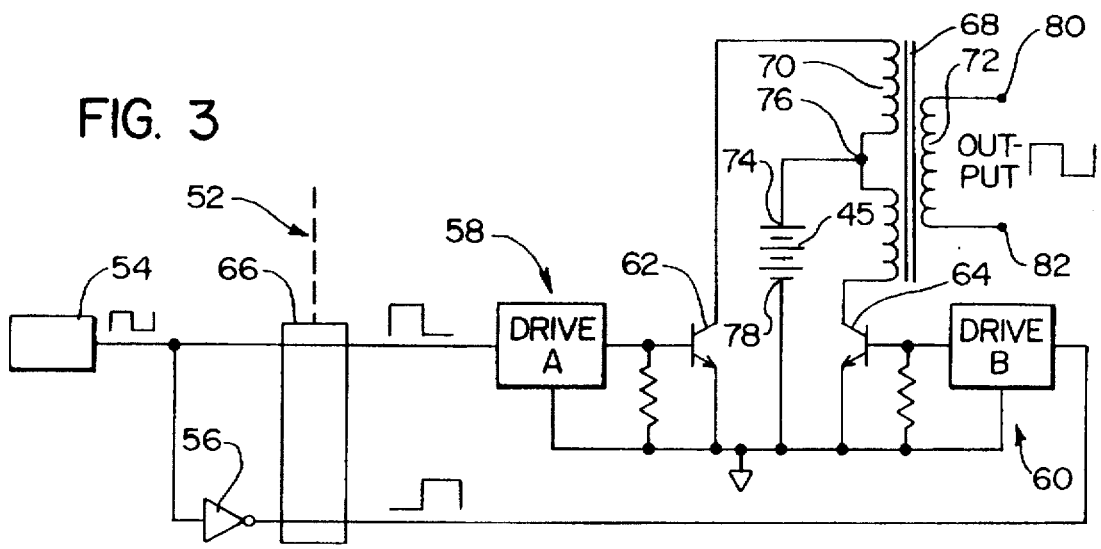
FIG. 3 is a schematic depiction of a prior art inverter module.
Figure 4:
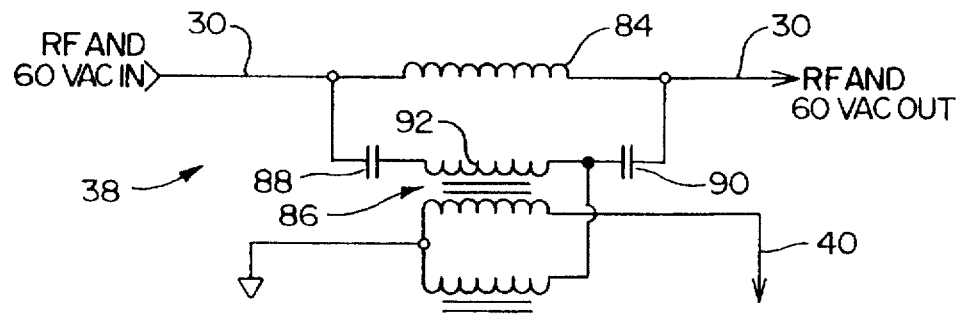
FIG. 4 is a simplified circuit diagram of a typical tap employed in the distribution system depicted in FIG. 1.
Figure 5:
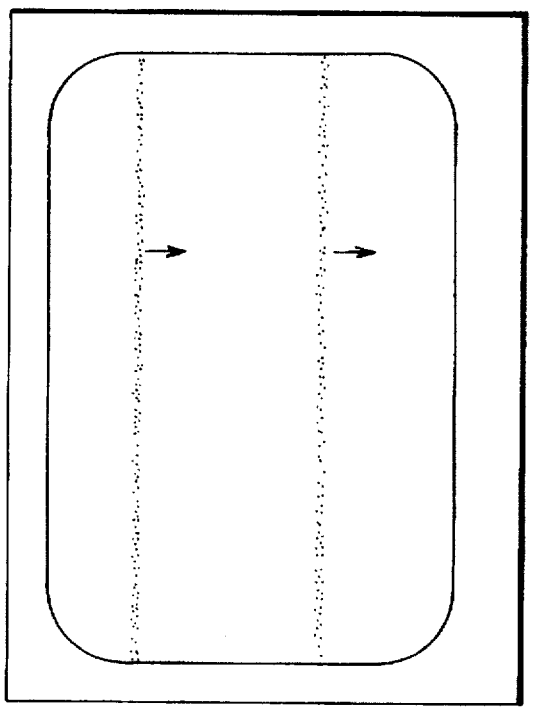
FIG. 5 is an illustration of the typical interference problem solved by the present invention.
Figure 6:
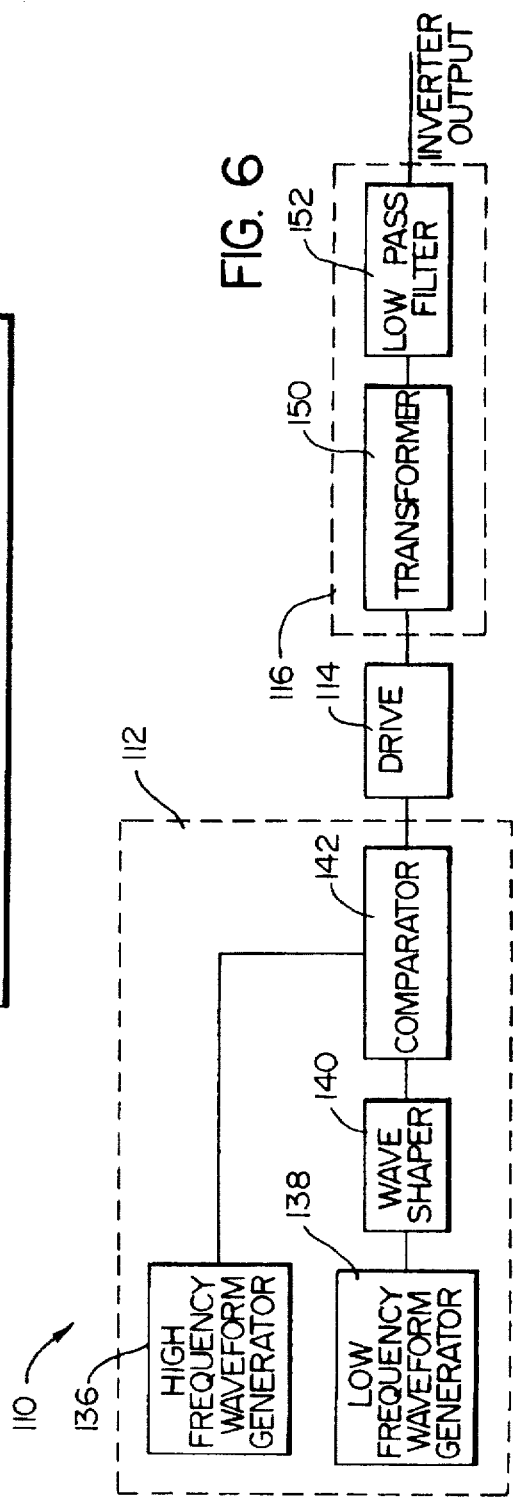
FIG. 6 is a simplified block diagram of an inverter module constructed in accordance with the present invention.

Depicted at 110 in FIG. 6 is an inverter circuit 110 constructed in accordance with, and embodying, the principles of the present invention. This circuit 110 may be substituted in the inverter module 44 for the inverter circuit 52 described above.

At its most basic, the inverter circuit 110 comprises a control signal generating circuit 112, a drive circuit 114, and an output circuit 116. The inverter circuit 110 generates as its output an AC power signal such as that indicated at 118 in FIG. 7. The AC power signal is cyclical, has a period P, and comprises positive and negative half-cycles, which are indicated by reference characters 120 and 122, respectively. As shown, one positive and one negative half-cycle occur during each period P.

The negative half-cycle 122 is an inverted mirror image of the positive half-cycle 120. Accordingly, the following discussion will concentrate on the positive half-cycle depicted at 120 with the understanding that the parameters of this positive half-cycle 120 apply in an inverted, mirror image fashion to the negative half-cycle 122.

The positive half-cycle 120 of the exemplary AC power signal 118 comprises: (a) a gradually increasing rising portion 120a and a gradually decreasing falling portion 120b so shaped, as will be described in detail below, that they do not cause the voltage spikes described above in the Background of the Invention; and (b) a substantially flat peak portion 120c for efficient delivery of power to the line extenders 32 described above. The shape of the positive half-cycle 120 will be described in further detail below.

Figure 7:
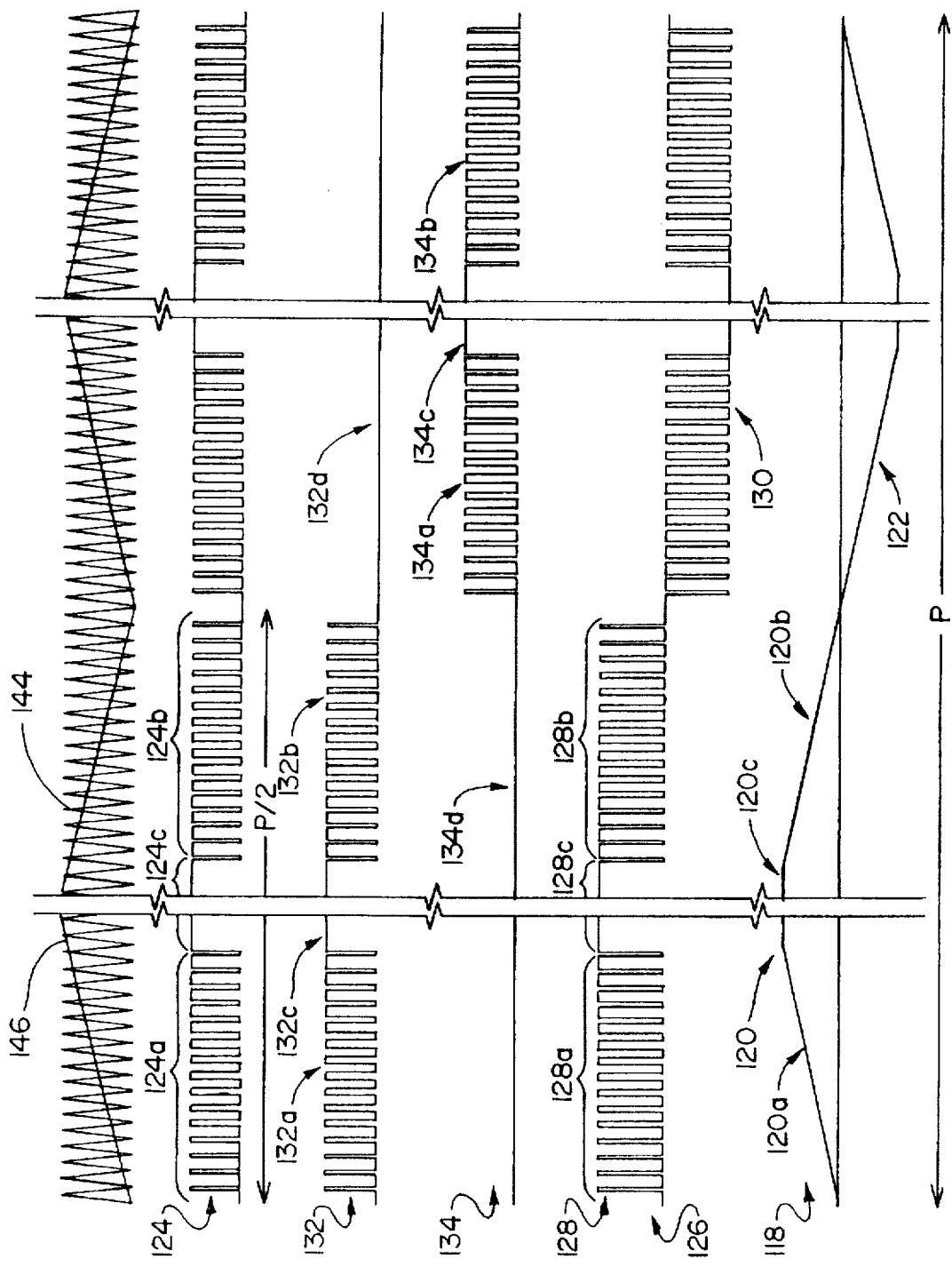
FIG. 7 is a timing diagram illustrating the timing relationships of the various signals within the inverter module of the present invention.

Referring again to the inverter circuit 110, the exemplary control signal generating circuit 112 thereof generates a control signal such as that depicted at 124 in FIG. 7. This control signal 124 is cyclical with a period of P/2. Each cycle of the control signal 124 comprises first and second portions 124a and 124b containing a series of pulses and a third portion 124c containing a single pulse. The width of each of the pulses in the first and third portions 126 and 130 is smaller than that of the pulse in the second portion 122 of the control signal.

The drive circuit 114 generates a pulsed power signal such as that indicated at 126 in FIG. 7. The pulsed power signal 126 is cyclical, also has the period P, and comprises positive and negative half-cycles 128 and 130, respectively. The negative half-cycle 130 is the identical to, but inverted from, the positive half-cycle 128. The timing of the positive and negative half-cycles 128 and 130 corresponds to the timing of each cycle of the drive signal 124.

The output circuit 116 integrates the pulsed power signal to obtain the AC power signal 118.

This circuit 110 employs drive signals such as those indicated at 132 and 134 in FIG. 7 as inputs to the drive circuit 114; these drive signals 132 and 134 comprise a series of pulses and allow any switching transistors employed in the drive circuit 114 to operate efficiently in either the "ON" or the "OFF" states. This is highly desirable for the reasons described in the Background of the Invention and will also be discussed in further detail below.

Additionally, as will also be described more fully below, the control signal generating circuit 112 is so designed that the widths of the pulses within the first and third portions 124a and 124b of the control signal 124 are altered to provide rising and falling portions 120a and 120b with a shape that substantially inhibits the above-discussed voltage spikes being created within the taps 38.

Referring now back to FIG. 6, it can be seen that the exemplary control signal generating circuit 112 basically comprises a high frequency waveform generator 136, a low frequency waveform generator 138, a wave shaper 140, and a comparator 142. The high frequency waveform generator 136 generates a carrier signal having a sawtooth waveform such as the one depicted at 144 in FIG. 7. The low frequency waveform generator 138 generates a modulation signal also having a sawtooth waveform. The modulation signal is shaped by the wave shaper 140 to obtain a clipped sawtooth waveform such as that depicted at 146 in FIG. 7.

The just-mentioned comparator 142 has as its inputs the high frequency carrier signal 144 and the modulator signal 146; in response to these inputs, the comparator 142 generates the control signal 124 depicted in FIG. 7. The comparator 142 generates a "HIGH" voltage level when the modulator signal 146 is greater than the high frequency carrier signal 144 and a "LOW" voltage level when the modulator signal 146 is less than the carrier signal 144. The resulting control signal 124 is such that the widths of the pulses in the first portion 124a gradually increase over time and the widths of the pulses in the second portion 124b gradually decrease over time.

Referring again to FIG. 6, the output circuit 116 can be seen to comprise a linear transformer 150 and a low pass filter 152. The transformer 150 is designed to alter or, in this exemplary case, step up the voltage of a signal applied to its input.

The low pass filter 152 is designed to integrate the pulsed power signal 126 to obtain the standby AC power signal 120; more specifically, the low pass filter 152 smooths out the first and third portions 128a and 128b of the pulsed power signal 126 to obtain the rising and falling portions 120a and 120b depicted in FIG. 7.

By comparing the waveforms of the modulator signal 146 and the standby AC power signal 118, it can be seen that the standby AC power signal 118 has the same basic waveform as the modulator signal 146. In general, the circuit 110 maintains this relationship for waveforms other than the exemplary clipped sawtooth, or trapezoidal, wave described above; the shape of the waveform of the standby AC power signal 118 generated by the inverter circuit 110 is thus be controlled by the shape of the modulator signal 146.

Figure 8:
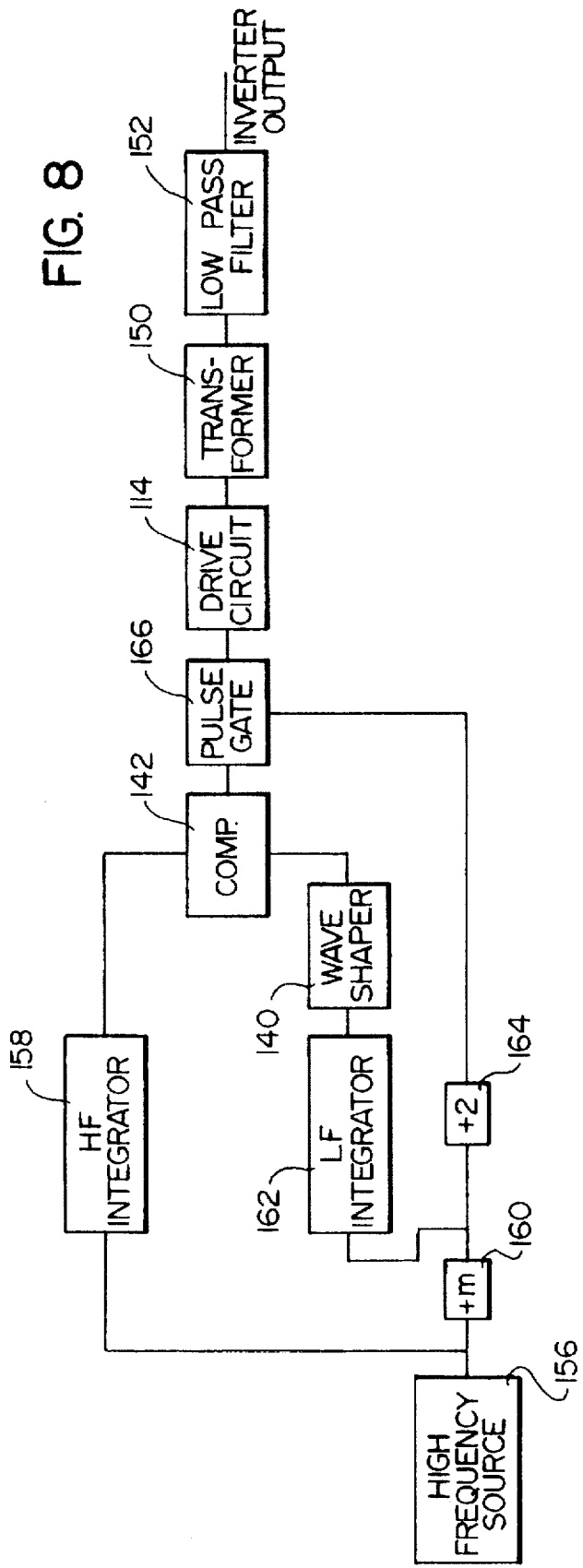
FIG. 8 is a more detailed block diagram of the inverter module of the present invention.
Figure 9B:
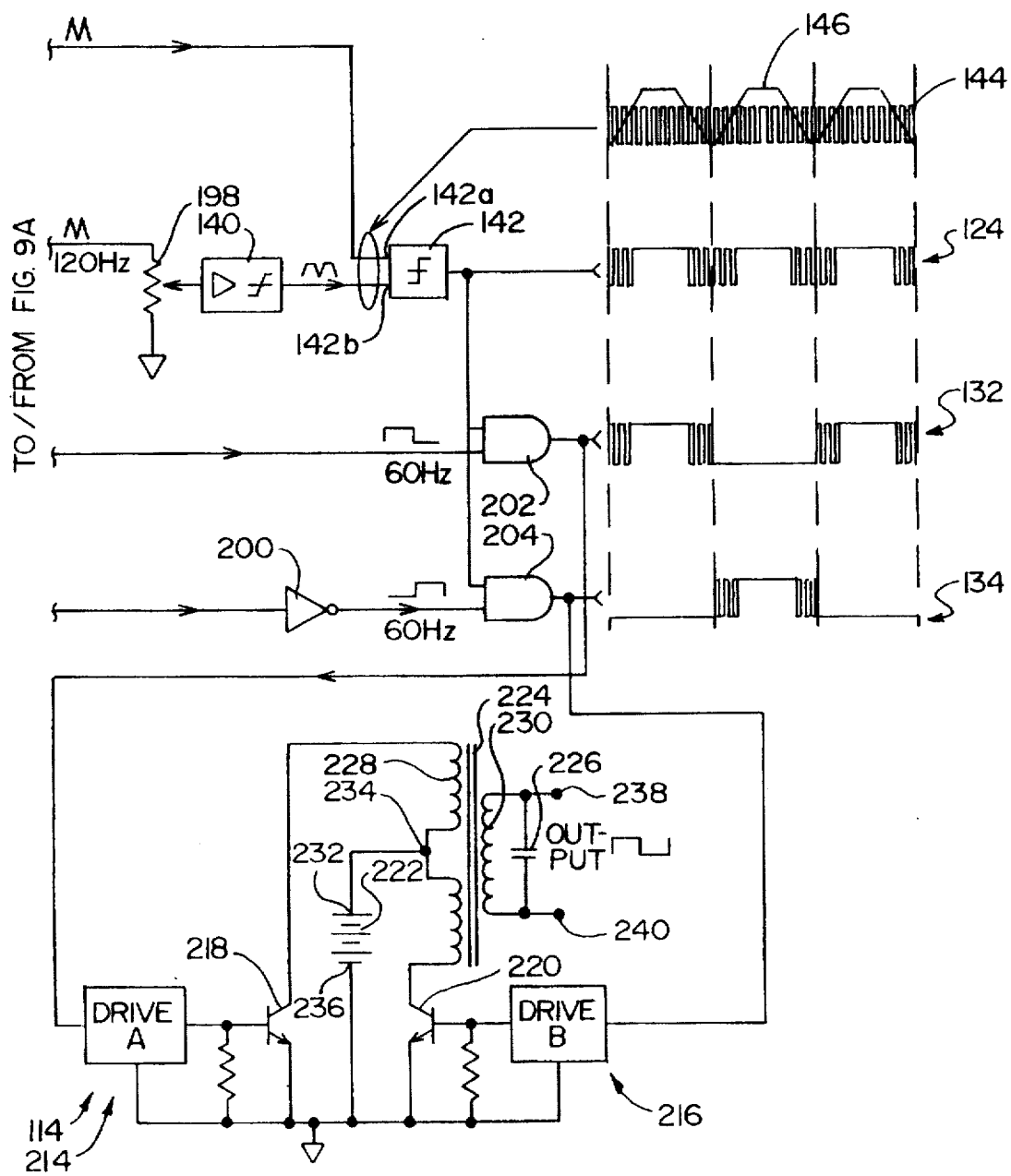
FIG. 9 is a simplified circuit diagram of the inverter module depicted in FIG. 8.

The inverter circuit 110 is depicted in further detail at 154 in FIGS. 8 and 9, FIG. 8 being a block diagram showing the overall arrangement of the components in the more detailed circuit diagram shown in FIG. 9.

Specifically, this circuit 154 shows that the low and high frequency waveform generators 136 and 138 preferably share a common frequency source 156 to maintain phase relationships between the carrier and modulator signals. This also allows efficient gating of the signal input to the drive circuit 114, as will be described further below.

The frequency source 156 generates a high frequency square wave. The high frequency waveform generator further comprises a high frequency integrator 158 that generates the sawtooth waveform carrier signal from the square wave generated by the high frequency source 156.

The low frequency waveform generator 138 additionally comprises a first divider circuit 160 and a low frequency integrator 162. The first divider circuit 160 divides the high frequency square wave generated by the frequency source 156 by an integer m, and the low frequency integrator 162 shapes the output of the divider circuit 160 to obtain a triangular waveform. The wave shaper 140 clips off the peaks of the triangular waveform generated by the low frequency wave shaper 162 to obtain the modulator signal 146 shown in FIG. 7.

The circuit 154 depicted in FIG. 8 also shows that the circuit 110 preferably additionally comprises a second divider circuit 164 that divides the output of the first divider circuit 160 by a factor of 2. The output of this second divider circuit 164 is used by a pulse gating circuit 166 to gate or select the output of the comparator 142 for purposes that will become clear from the following discussion.

Referring now to the more detailed FIG. 9, it can be seen that the high frequency source 156 preferably comprises the following basic elements: (a) an oscillator 168; (b) a third dividing circuit 170 for dividing the output of the oscillator 168 by an integer n; and (c) a voltage controlled oscillator 172. Optionally, the frequency source 156 also may comprise a phase lock loop comprising a connection 174 to the line voltage, a line sense element 176, a line shaper 178, a transfer relay 180, a phase comparator 182, and a low pass filter 184 for maintaining stability of the phase lock loop.

The basic effect of the oscillator 168, third divider circuit 170, and voltage controlled oscillator 172 is to obtain a stable high frequency square wave. Any combination of elements that perform this function may be inserted as replacements for these elements 168, 170, and 172.

The arrangement of the oscillator 168, third divider circuit 170, and voltage controlled oscillator 172, however, allow easy implementation of the optional phase lock loop. The optional phase lock loop ensures that, when the power supply switches from AC mode to inverter mode, the inverter or standby AC power signal generated by the inverter module 44 is in phase with the line AC power signal.

The phase lock loop operates in the following basic manner. As long as the line sense 176 indicates that no fault exists, the relay 180 is operated to allow the 60 Hz output of the line shaper 178 to pass through the phase comparator 182. The other input to this phase comparator is a 60 Hz signal generated downstream of the VCO 172 based on the output of the VCO 172. When the line sense 176 detects a fault, the relay 180 is operated to direct the 60 Hz output of the oscillator 168 into the phase comparator 182, thereby disconnecting the output of the line shaper 178 from the phase comparator 182. The phase comparator 182 compares the phase of the 60 Hz signal obtained downstream of the VCO 172 with the phase of the signal generated by the divider 170 and shifts the phase of the signal generated by the divider 170 to match that of the signal obtain downstream of the VCO 172. This ensures that the phase of the standby AC power signal matches that of the line AC power signal when the relay 50 switches therebetween.

The output of the VCO 172 is directed to the divider 160 and a first input resistor 186 of a first amplifier 188. Connected between an output terminal 188b of the first amplifier 188 and the first input terminal 188a is a feedback capacitor 190. A second input terminal 188c of the amplifier 188 is connected to a first reference voltage. The values of the resistor 186, capacitor 190, and first reference voltage are chosen to generate a sawtooth waveform having substantially the same period and phase as the high frequency square wave generated by the VCO 172. The first amplifier 188 and its associated components form the high frequency integrator 158.

The output of the divider element 160 is directed to the divider element 164 and a second input resistor 192 connected to a first input terminal 194a of a second amplifier 194. Connected between an output terminal 192b of the second amplifier 194 and the first input terminal 194a is a second feedback capacitor 196. A second input terminal 192c of the second amplifier 190 is connected to a second reference voltage. In a manner similar to that of the components associated with the first amplifier 188, the values of the second input resistor 192, second feedback capacitor 196, and second reference voltage are chosen to generate a sawtooth waveform having substantially the same period and phase as the low frequency square wave generated by the divider 160. The output terminal 194b of the second amplifier is connected to a variable resistor 198 to allow control of the slope of the sawtooth waveform generated at the output terminal 194b. The second amplifier 194 and its associated components form the low frequency integrator 162.

The variable resistor 198 is connected to the wave shaper 140 to clip the peaks off of, or limit the amplitude of, the sawtooth waveform generated at the output 194b of the second amplifier 194.

The output of the amplifier 188 is applied to a first input terminal 142a of the comparator 142, while the output of the wave shaper 140 is applied to a second input terminal 140b of the comparator 142.

The output of the above-mentioned divider element 164 is sent to an inverting element 200 and one input of a first AND gate 202. The output of the inverting element 200 is sent to one input of a second AND gate 204. The output of the comparator 142 is applied to the other inputs of the AND gates 202 and 204. The inverting element 200 and the first and second AND gates 202 and 204 form the pulse gating circuit 166.

Referring again to FIG. 7, the timing of the various signals mentioned above will be described in further detail.

Initially, it should be noted that the output of the VCO 172 is 60*2* m Hz in a system designed for use in. with a 60 Hz line signal. The integer "m" can be selected as appropriate for a given line frequency, but should be on the order of 10 to 50 KHz.

The output of the VCO 172 is applied directly to the first input resistor 186, so the frequency of the sawtooth high frequency carrier signal is also 60*2* m Hz.

The divider element 160 divides the output of the VCO 172 by m, yielding a signal having a frequency of 60*2 Hz, or 120 Hz. Accordingly, from the discussion above, it can be seen that the frequency of the low frequency modulator signal is the same as that of the output of the divider element 160, or 120 Hz.

The divider element 160 divides the output of the divider element 160 by 2, leaving a signal having a frequency of 60 Hz. This 60 Hz signal is not shaped, so the input to the AND gate 202 is a 60 Hz square wave, while the input to the AND gate 204 is a 60 Hz square wave 180° out of phase with that input to the AND gate 202.

As mentioned above, the comparator 142 generates a "HIGH" voltage level when the modulator signal 146 is greater than the high frequency carrier signal 144 and a "LOW" voltage level when the modulator signal 146 is less than the carrier signal 144. With the modulator signal 146 and carrier signal 144 as described above, the comparator output or control signal 124 (as shown in FIG. 7) comprises in each cycle the first portion 124a, the second portion 124b, and the third portion 124c. Further, the widths of the pulses in the first and third portions 124a and 124b are much smaller than the width of the pulse in the second portion 124c, with the width of the pulses in the first portion 124a gradually increasing over time and the width of the pulses in the second portion 124b gradually decreasing over time. In the present example, these first, second, and third portions 124a, 124b, and 124c of the 124 are repeated at a frequency of 120 Hz.

The comparator output signal 148 is ANDed with the above described 60 Hz square waves by the AND gates 202 and 204 to obtain the first and second drive signals indicated at 132 and 134 in FIG. 7. Specifically, the AND gate 202 selects every other cycle of the control signal 124 to generate the first drive signal 118, while the AND gate 204 selects the cycles of the control signal 124 not selected by the AND gate 202 to generate the second drive signal 212. The resulting signals 132 and 134 each have a period P and have one half-cycle containing pulses of first, second, and third portions 132a, 132b, 132c and 134a, 134b, 134c corresponding to the first, second, and third portions 124a, 124b, and 124c and another half-cycle 132d and 134d of zero volts ("LOW"). The AND gates 202 and 204 ensure that half-cycles 132d occur at the same time as the portions 134a, 134b, and 134c and the half-cycle 134d occurs at the same time as the portions 132a, 132b, and 132c.

These drive signals 132 and 134 are sent to the drive circuit 114, which, as shown in FIG. 9, comprises: first and second drive circuits 214 and 216, first and second switching transistors 218 and 220, a battery 222, a linear transformer 224, and an output capacitor 226. The transformer 224 has first and second windings 228 and 230. A positive terminal 232 of the battery 222 is connected to a center tap 234 of the first winding 228; a negative terminal 236 of the battery 222 is connected to ground.

The first and second switching transistors 218 and 220 are connected at their bases to the first and second drive circuits 214 and 216, respectively. The emitters of these transistors 214 and 216 are connected to ground, while the collectors thereof are connected to opposite ends of the first winding 228.

The ends of the second winding 230 are connected to output terminals 238 and 240, with the output capacitor 226 being connected across these terminals 238 and 240. The low pass filter 152 comprises the output capacitor 226.

The first and second drive signals 132 and 134 are applied to the first and second drive circuits 214 and 215. In response to these control signals, the first and second drive circuits provide an appropriate voltage to the bases of the switching transistors 218 and 220 to turn these transistors "ON" when the control signals are "HIGH". When either of the transistors 218 and 220 is "ON", current flows from positive terminal 232 of the battery 222, through the transformer center tap 234, out the appropriate end of the transformer first winding 228, through the "ON" transistor, and to ground (battery negative terminal 236).

it should be noted that the pulsed drive signals 132 and 134 are so switched between "HIGH" and "LOW" that the transistors 218 and 220 are always in their "ON" or "OFF" states; these transistors 218 and 220 thus spend very little time in the relatively inefficient linear range between "ON" and "OFF".

The output of the transformer 224 without the capacitor 226 connected across the outputs of the terminals 238 and 240 is the pulsed power signal depicted at 126 in FIG. 7. By integrating this pulsed signal 126 using the capacitor 226, the standby or inverter AC power signal depicted at 118 in FIG. 7 is obtained.

The shape of the signal 118 is important to practicing the principles of the present invention, and the rising and falling portions 120a and 120b of this half-cycle 120 are of particular interest.

In order to avoid the interference problem described above, the rising and falling portions 120a and 120b should remain within certain parameters. Specifically, these rising and falling portions 120a and 120b should not exit regions 252 and 254 inclusively defined by a sinusoidal curve segments 256a and 256b and/or first and second line segments 258 and 260 depicted in FIG. 10.

Figure 10:
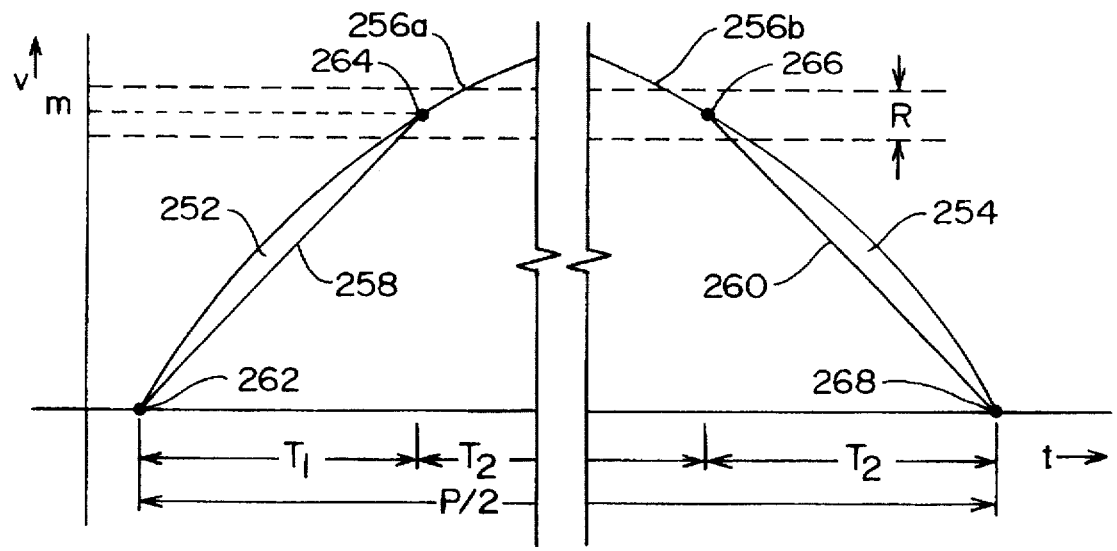
FIG. 10 depicts the regions within which the rising and falling portions of the AC power signal constructed in accordance with the present invention must fall to reduce saturation of the taps.

The sinusoidal curve segments 256a and 256b are portions of a sinusoidal curve having the same period P as, and which is in phase with, the inverter or standby AC power signal 120. In the exemplary AC power signal 118, these segments 256a and 256b are portions of the same sinusoidal curve, but this is not necessary to successfully implement the present invention. It is only required that the amplitude of this sinusoidal curve or curves is such that the curve or curves pass through first through fourth points 262, 264, 266, and 268 as shown in FIG. 10.

The first and fourth points 258 and 264 corresponds to the points at which the AC power signal 120 crosses over from negative to positive and from positive to negative, respectively. The second and third points 264 and 266 correspond to the beginning and end, respectively, of the relatively flat, third portion 120c of the power signal 120.

The first line segment 258 extends between the first and second points 262 and 264, while the second line segment 260 extends between the third and fourth points 266 and 268. In the preferred embodiment described above, to obtain the full benefits of the present invention, the slope of the line segment 258 should correspond to a slew rate range of 30 V/ms to 50 V/ms inclusive. Similarly, the slope of the exemplary line segment 260 should correspond to a slew rate range of −30 V/ms to −50 V/ms inclusive. The slope of these line segments 258 and 260 need not be the same; however, these segments 258 and 260 have the same slope in the exemplary AC power signal 118.

Referring now for a moment back to the second and third points 264 and 266 employed to locate the curve segments 256a, 256b and line segments 258 and 260, these points 264 need not have the same magnitude M but do so in the exemplary AC Dower signal 118.

Further, the points 264 and 266 may be identified by initially identifying the first and fourth points. For any given standby AC power signal, the second point 264 is the point at which the slope of the AC power signal curve leaves the range of rising slew rates defined above. Similarly, the third point 266 occurs at the point at which the slope of the AC power signal curve enters the range of falling slew rates defined above.

Another aspect of the preferred embodiment is that time durations $T_1$ and $T_2$ of the first and second portions 120a and 120b should be between 17% and 30% of a time duration P/2 of the positive half-cycle 128. This ensures that the standby AC power signal 120 contains a significant relatively flat central portion during each half-cycle for the purpose of efficiently delivering power to the line extenders 32, as discussed above. With the exemplary standby AC power signal 118, $T_1$ and $T_2$ are the same.

As briefly discussed above, the exact shape of the leading and trailing portions 120a and 120b is not important as long as the AC power signal 118 remains within the regions 252 and 254. However, the leading and trailing edges 120a and 120b of the exemplary half-cycle 120 of the AC power signal 118 depicted above follow the line segments 258 and 260. The circuit 110 thus yields a standby AC power signal 120 that is essentially trapezoidal.

Alternatively, by designing the low frequency waveform generator 138 and the wave shaper 140 so that the modulator signal 146 is a sine wave, a sinusoidal standby AC power signal may be obtained such that the rising and falling portions of each half-cycle thereof follow the sinusoidal curve 256. The waveform depicted at 270 in FIG. 11 contains essentially sinusoidal rising and falling portions 270a and 270b.

Figure 11:
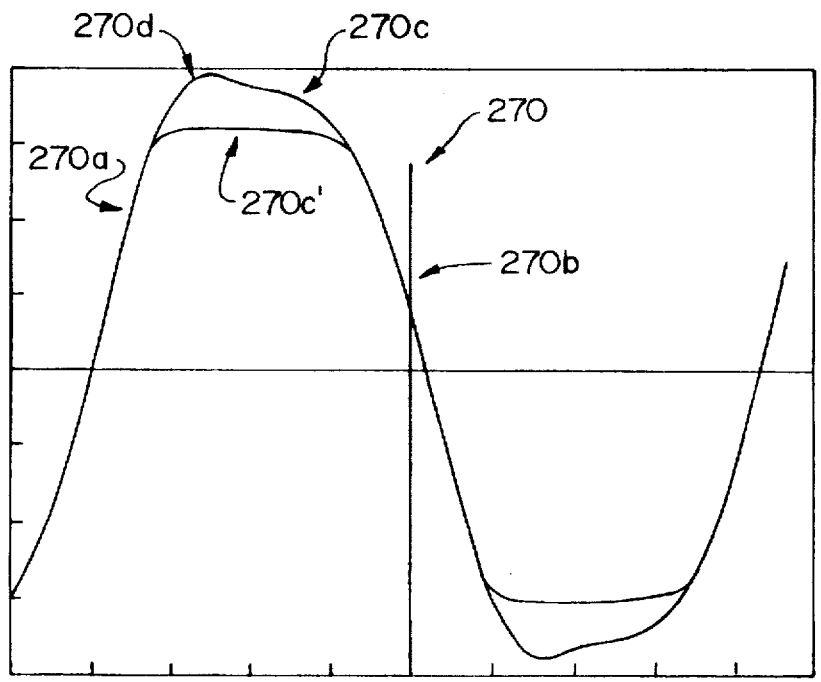
FIG. 11 depicts an alternative AC power signal produced in accordance with the principles of the present invention.
Figure 12:
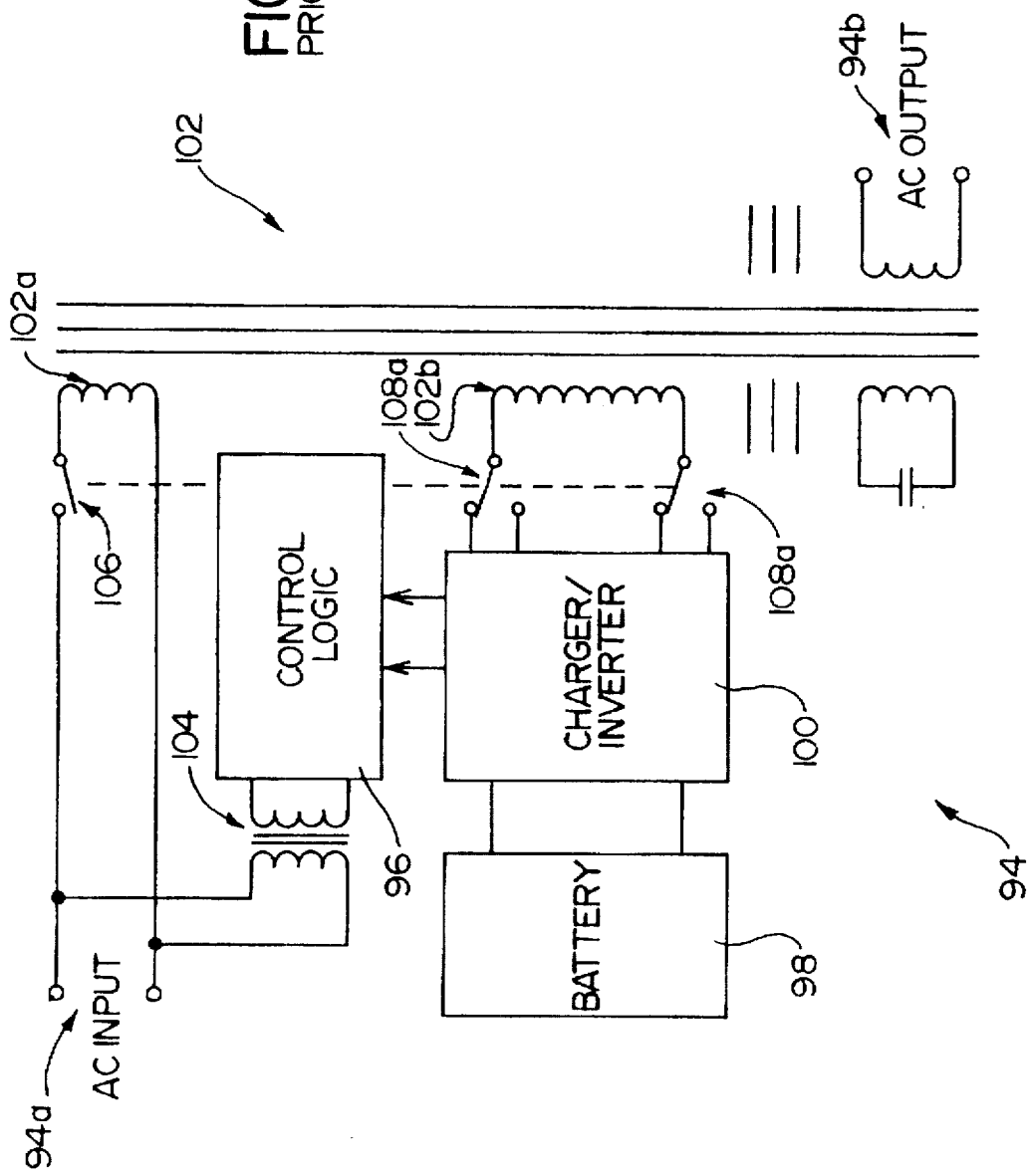
FIG. 12 depicts a prior art power supply employing a ferroresonant transformer.
Figure 13:
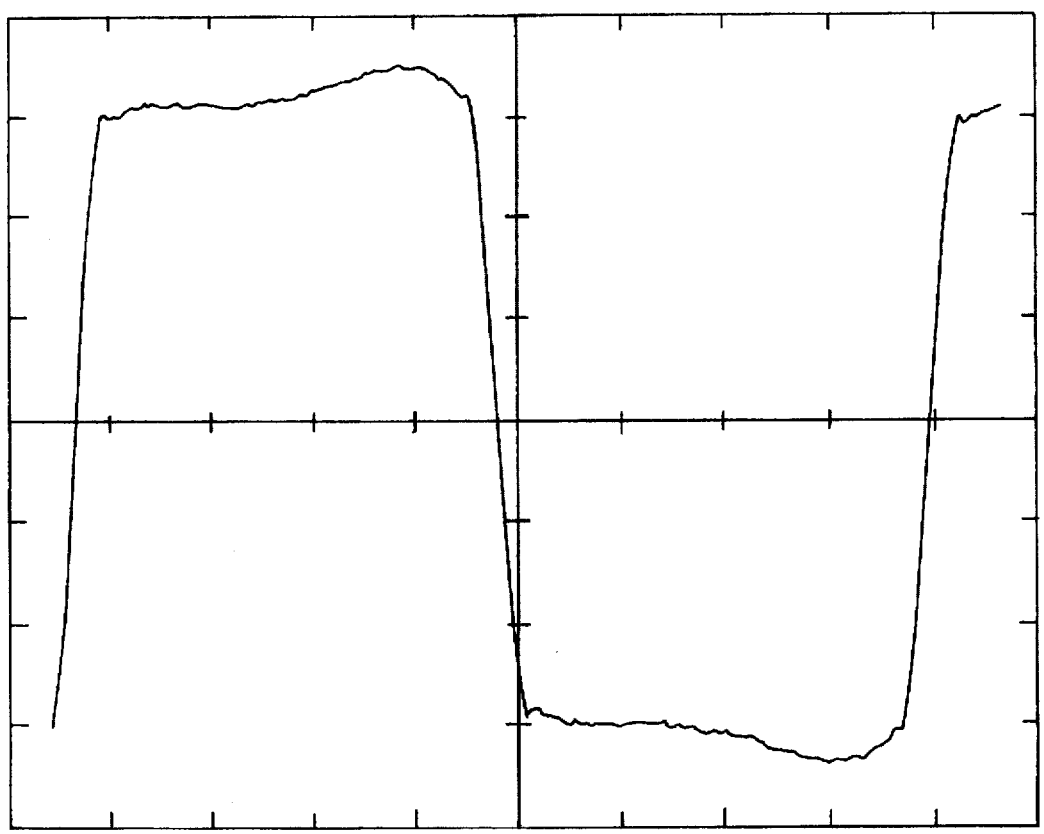
FIG. 13 depicts the output of the power supply depicted in FIG. 12.

It should be noted that an AC power signal having sinusoidal rising and falling portions such as those shown at 270a and 270b in FIG. 11 or linear rising and falling portions such as those shown at 120a and 120b in FIG. 7 are the most desirable for the purposes of the present invention because they may be relatively easily and inexpensively implemented.

It should also be noted that the third portion 120a of the AC power signal half-cycle 120, which has been described above as relatively flat, need not be absolutely flat between the second point 264 and the third point 266; however, at no point between these points 264 and 266 should the slope of the AC power signal 118 exceed 50 V/ms or go below −50 V/ms. Additionally, between these points 264 and 266, the exemplary AC power signal 118 should remain within a range R of 75±5 volts, inclusive, centered around the magnitude M (75 volts in the exemplary embodiment) of the points 264 and 266.

In the waveform 270 depicted in FIG. 11, it can be seen that a central potion 270c thereof comprises a slight peak indicated at 270d when the power supply is unloaded. A central portion 270c of the waveform 270 when the power supply is loaded, however, does not contain a peak such as that depicted at 270d. Such variations in the shape of the central portion of a standby or inverter AC power signal are well within the variations that may actually occur when successfully implementing the principles of the present invention.

A standby or inverter AC power signal generated within the parameters described above should substantially eliminate the interference problem caused by saturation of the coupling transformers in the taps.

Figure 14:
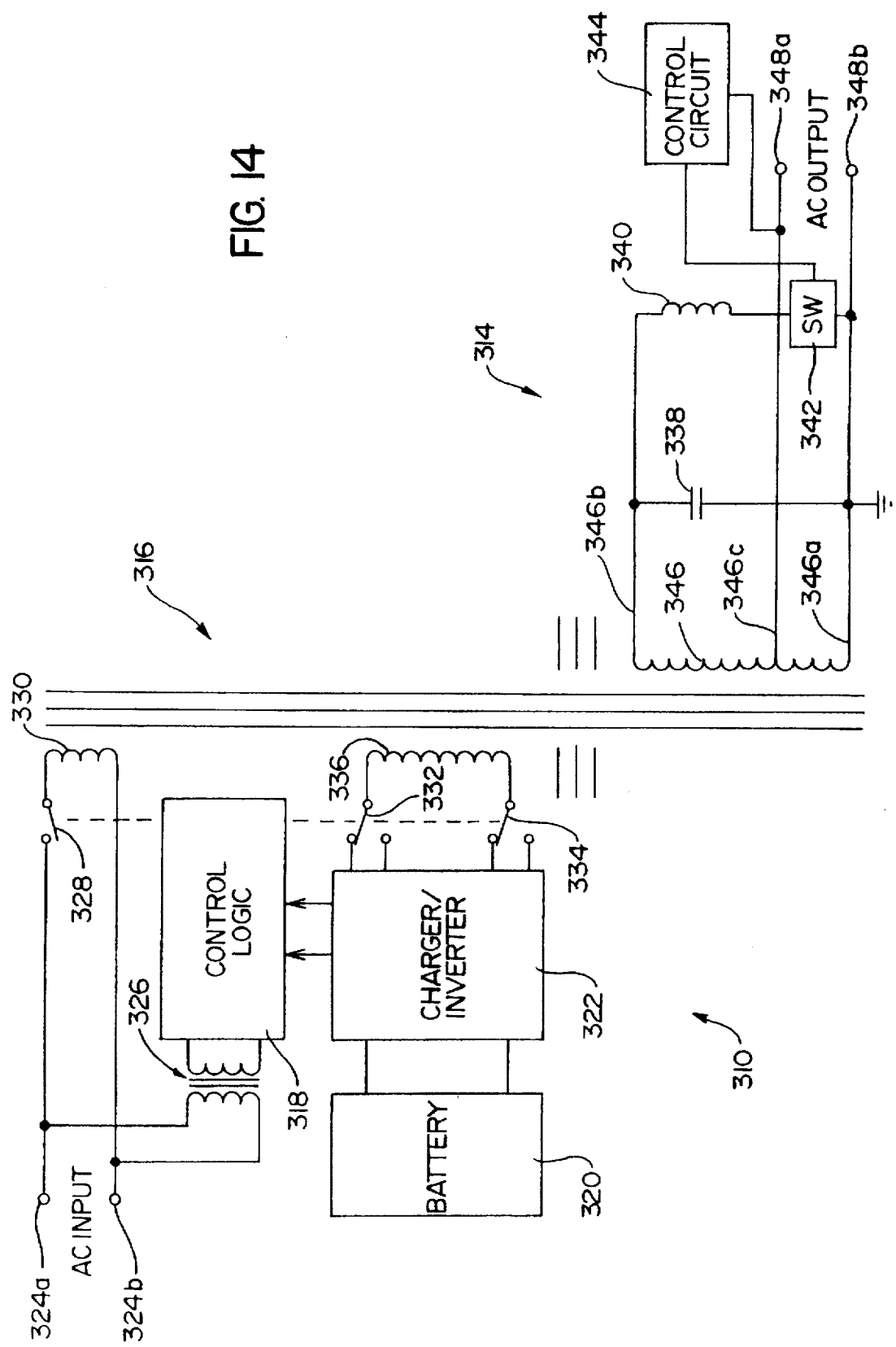
FIG. 14 depicts a power supply having a ferroresonant transformer constructed in accordance with, and embodying, the principles of the present invention.

Referring now to FIG. 14, depicted therein is a block diagram of an exemplary power supply 310 constructed in accordance with, and embodying, the principles of the present invention. The power supply 310 basically comprises an input or primary portion 312, an output or secondary portion 314, and a ferroresonant transformer 316.

The input portion 312 basically comprises a control circuit 318, a battery 320, and a charger/inverter circuit 322. AC line voltage is present at input terminals 324a,b of the power supply 310. A control transformer 326 allows the control logic circuit 318 to monitor the AC line voltage. A line switch 328 is connected between the input terminals 324a,b and input or primary windings 330 of the ferroresonant transformer 316. Charger/inverter switches 332 and 334 are connected between the charger/inverter circuit 322 and a second set of input or primary windings 336 of the ferroresonant transformer 102 shown in FIG. 14.

This input portion 312 of the power supply 310 operates in the same basic fashion as the input portion of the power supply 94 described above and will not be described in detail again.

The output portion 314 of the power supply 310 basically comprises a resonant, capacitor 338, an inductor 340, a switch 342, and a output control circuit 344. The resonant capacitor 338 is connected across output or secondary windings 346 of the ferroresonant transformer 316. The inductor 340 and switch 342 are connected in series with each other and in parallel with the resonant capacitor 338 across the output windings 346. A first side 346a of the output windings 346 is connected to ground.

The resonant capacitor 338 controls the frequency of the AC power signal; the value of the resonant capacitor 338 is 20 microfarads in the exemplary power supply 310.

The output control circuit 344 controls the switch 342 based on the AC power signal across output terminals 348a and 348b. The first output terminal 348a is connected to a center tap 346c of the output windings 346, while the second output terminal 348b is connected to ground. The AC power signal will have the same shape as, but will be smaller in magnitude, than the voltage across the first and second terminals 346a and 346b.

The output circuit 314 operates basically as follows. In general, the output voltage across the output terminals 348a,b is controlled by the value of the resonant capacitor 338. However, the control circuit 344 opens and closes the switch 342 based on the level of the voltage present across the output windings 346. The opening and closing of the switch 342 controls the amount of current flowing through the inductor 340. Current flowing through the inductor 340 serves to vary the charging rate or effective capacitance of the resonant capacitor 338.

The control circuit 344 can therefore be designed to open and close the switch 342 at appropriate intervals to provide ferroresonant regulation without core saturation and in a manner that results in an AC output signal across the terminals 348a,b having the desired characteristics described above with reference to FIG. 10.

FIG. 15 depicts the relationship between the duty cycle of the switch 342 and the current $I_L$ flowing through the inductor 340. In particular, the current $I_L$ is shown at 350 in FIG. 15 while periods during which the switch 342 is opened and closed at relatively high frequency are depicted at 352 and 354 in that Figure. The leading edges 352a and 354a of the periods 352 and 354 are moved as shown by arrows A and B according to an error signal developed based on the voltage across the output or secondary windings 346. The trailing edges 352b and 354b of the periods 352 and 354 correspond in time to the zero crossing points 356 and 358 of the inductor current $I_L$. As will be described in further detail below, the time periods 352 and 354 depicted in FIG. 15 can be manipulated to obtain an AC power signal across the terminals 348a,b that can be held within precise waveform shape, frequency, and amplitude parameters.

Referring now to FIG. 16, depicted therein is a block diagram showing the details of operation of an exemplary output control circuit 334a. This control circuit 334a basically comprises a zero crossing detecting circuit 360, a sawtooth generating circuit 362, a short circuit detecting circuit 364, a mean value determining circuit 366, a reference setting circuit 368, an error amplifier 370, a soft start circuit 372, a comparator circuit 374, a high frequency switched oscillator 376, and a coupling circuit 378.

The mean value determining circuit 366 generates a DC signal representing the mean value of the AC power signal. The error amplifier 370 generates an error signal corresponding to the difference between the mean value signal generated by the circuit 366 and a reference signal generated by the reference circuit 368. In the absence of a short circuit, the error signal enters the comparator circuit 374, where it is compared with a sawtooth signal generated by the sawtooth generating circuit 362. When a short circuit occurs, the short circuit detecting circuit 364 causes the soft start circuit 372 to prevent the sawtooth signal from reaching the comparator circuit 374.

The signal generated by the sawtooth generator 362 is a sawtooth waveform that returns to zero at every pulse generated by the zero crossing detection circuit 360. The zero crossing detection circuit 360 generates a short pulse every time the voltage across the output or secondary windings 346 of the ferroresonant transformer 316 becomes zero.

The output of the comparator circuit 374 is a pulse train, where the trailing edge of each pulse occurs when the voltage across the output windings 346 crosses zero volts and the width of each pulse corresponds to the error signal: generally, as the error signal decreases, the pulse width increases; and, as the error signal increases, the pulse width decreases. The output of the comparator circuit 374 will be referred to herein as the ferro duty cycle signal. This is because, as will be discussed in further detail below, the widths of the pulses generated by the comparator circuit 374 generally correspond to the time periods during which the switch 342 is closed, such as the periods depicted at 352 and 354 in FIG. 15, which controls the amount of current flowing through the resonant capacitor 338.

The high frequency switched oscillator 376 generates a relatively high frequency signal whenever the output of the comparator circuit 374 is high. The pulsed high frequency signal generated by the oscillator 376 is passed through the coupling circuit 378 to the AC switch 342. The AC switch 342 is thus closed during the time periods when the output of the comparator circuit 374 is high.

The AC output signal generated by the power supply 310 employing the control circuit 334a is, in this manner, controlled to be the same as that depicted at 270 in FIG. 11.

Referring now to FIG. 17A–C and 18, shown therein are the details of construction and operation of the exemplary control circuit 334a.

Figure 17A:
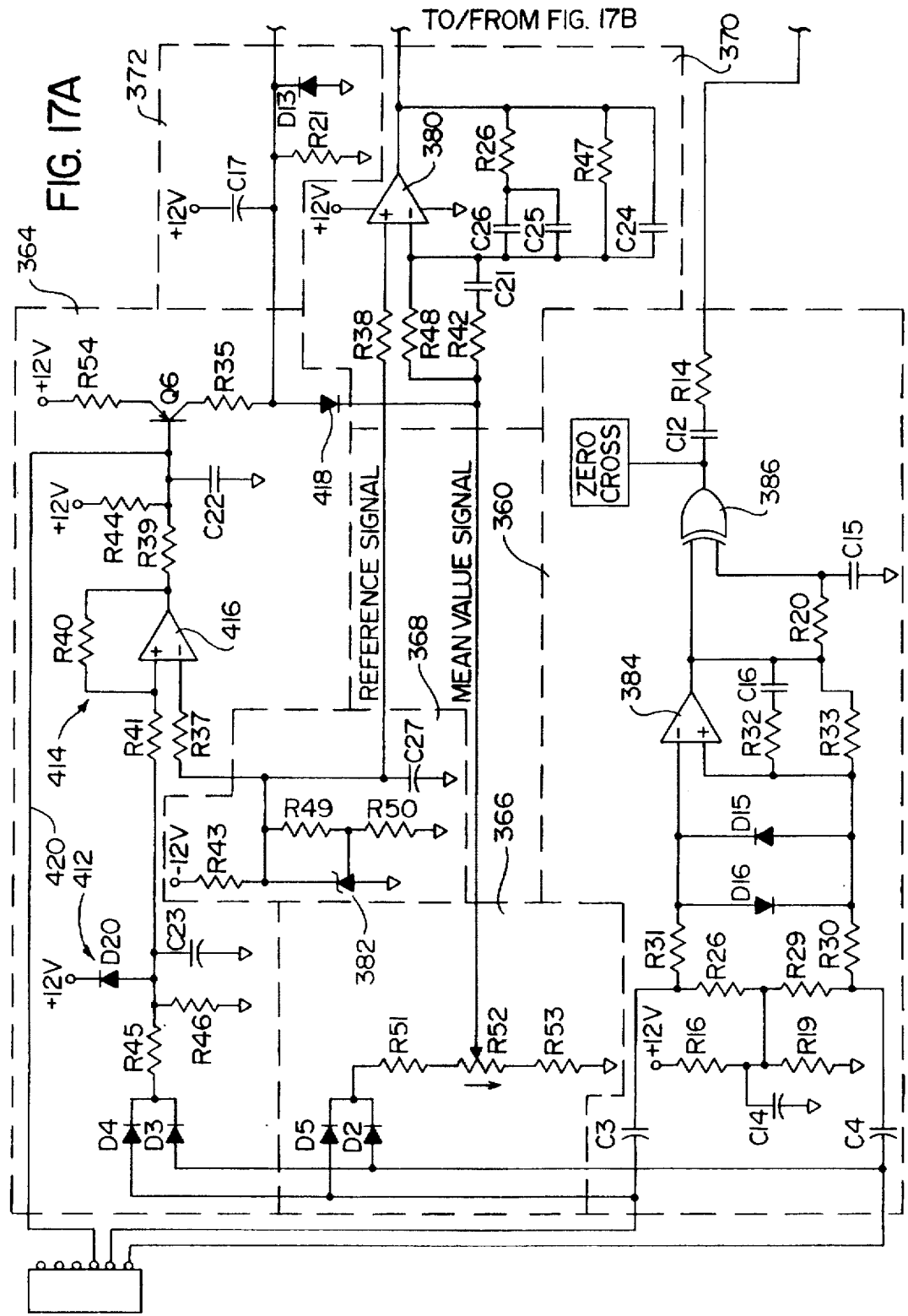
FIGS. 17A–C depict the control circuit of FIG. 16 in even further detail.

Turning initially to FIG. 17A, the error amplifier 370 is shown to comprise a differential amplifier 380 and its associated components. The components associated with the amplifier 380 are arranged in a known manner such that the amplifier 380 acts as a feedback integrator. In particular, R38 is a current limiting resistor for providing input protection, while resistors R48, R42, R26, R47 and capacitors C21, C24, C25, C26 provide loop compensation for the feedback integrator formed by the amplifier 380.

Accordingly, the inputs to the error amplifier 370 are the reference and mean value signals identified in FIG. 17A. The reference circuit 368 that generates the reference signal comprises an adjustable Zener diode 382, resisters R43, R49, and R50, and a capacitor C27. The level of the reference signal is set by the diode 382 and the values of the resisters R43, R49, and R50; capacitor C27 filters off any high frequency components of the reference signal.

The mean value determining circuit 366 generates a DC signal (the mean value signal) the amplitude of which corresponds to the mean value of the AC power signal. In particular, the diodes D2 and D5 generate a DC signal corresponding to the AC power signal, while resistors R51, R52, and R53 are scaling resistors that scale the DC signal so generated to the correct level.

The zero crossing detector circuit 360 is depicted at the bottom of FIG. 17A. The zero crossing detector circuit 360 has as its input the AC power signal and generates a short pulse each time the AC power signal crosses zero. In the zero crossing detector circuit 360, resistors R16, R19, R26, R29, R31, and R30 set the center of the sine wave input to the circuit 360. Diodes D16 and D15 clamp the sine wave. An operational amplifier 384 with associated resistors R32 and R33 and capacitor C16 form a Schmitt trigger that has as its output a square wave that is in phase with and has the same frequency as the sine wave input to the circuit 360. An XOR gate 386 generates a pulse train based on the square wave at the output of the amplifier 384, with the width of the pulses being determined by the values of resistor R20 and capacitor C15. Capacitor C12 further narrows the pulses generated at the output of the XOR gate 386. The value of the resistor R14 sets the width of the pulses so generated.

The sawtooth generator 362 (FIG. 17B) generates a sawtooth waveform based on the pulses generated by the zero crossing detector 360. In particular, the sawtooth generator 362 comprises: (a) a current source 388 formed by transistors Q5 and Q4, resistors R36, R24, and R22; (b) a capacitor C18, and (c) a switch amplifier Q3 having a resistor R15 associated therewith. The current source 388 charges the capacitor C18. The pulses generated by the zero crossing detector 360 close the switch Q3 to discharge the capacitor C18. The output of the sawtooth generator 362 is a sawtooth waveform that returns to zero every time the voltage across the transformer output windings 346 crosses zero.

The error signal generated by the error amplifier 370 and the sawtooth waveform generated by the sawtooth generator 362 are compared by the comparator circuit 374. The comparator circuit 374 comprises a differential amplifier 390 and the following components associated therewith: resistors R27, R17, R23, R25, and R34; capacitor C19; and a diode D18.

The ferro duty cycle signal generated by the comparator circuit 374 as shown in FIG. 18A is HIGH whenever the signal at its inverting input is lower than the signal at its non-inverting input and is LOW whenever the signal at its inverting input is higher than the signal at its non-inverting input.

The ferro duty cycle signal is sent to the high frequency switched oscillator circuit 376 where it modulates a high frequency carrier signal. In particular, the oscillator circuit 376 comprises first and second XOR gates 392 and 394 configured with resistors R16 and R10 and capacitor C11 to generate the high frequency carrier signal. A third XOR gate 396 and a diode D12 are connected to inhibit the high frequency carrier signal when the output of the comparator circuit 374 is low. As a result, a ferro drive control signal generated at the output of the oscillator circuit 376 comprises bursts of high frequency pulses, with the duration of each burst of pulses being related to the magnitude of the error signal.

The ferro drive control signal then connects through a resistor R11 and a switching transistor Q2 to a coupling transformer 398. The resistor R11 is a smoothing/switching resistor. A resistor R12 provides protection. A capacitor C13 filters out any AC components of the voltage Vbulk. A diode VR2 resets the magnetic core. A diode D14 prevents short circuiting of the coupling transformer 398. Diodes D9 and D10 rectify the output of the coupling transformer 398 to obtain signals appropriate for controlling the AC switch 342. Resistors R8 and R13 are current limiting resistors.

Referring for a moment to FIGS. 18A–C, depicted therein is a timing diagram showing the relationship of certain of the signals within the output control circuit 334a at two different points in time. In FIG. 18A, the error signal generated by the error amplifier 380 at a first point in time is depicted at 404a and the sawtooth signal generated by the sawtooth generator 362 and zero crossing detector 360 is depicted at 406. The ferro duty cycle signal is depicted at 408 in FIG. 18B. Depicted at 410 in FIG. 18C is the ferro drive control signal. In FIG. 18A, the error signal generated by the error amplifier 380 at a second point in time is depicted at 404b and the sawtooth signal generated by the sawtooth generator 362 and zero crossing detector 360 is again depicted at 406.

The ferro duty cycle signal is depicted at 408 in FIG. 18B. Depicted at 410 in FIG. 18C is the ferro drive control signal.

By comparing the signals depicted in FIGS. 18A–C, it can be seen that the width of the ferro duty cycle signal 408 decreases as the error signal 404 increases. The widths of the pulse bursts in the ferro drive control signal 410, which correspond to the widths of the pulses in the ferro duty cycle signal 408, also decreases with an increasing error signal.

Thus, as the error signal 404 varies with the deviation of the AC power signal from a predetermined voltage, the ferro drive control signal 410 varies to control the output winding voltage as necessary to keep the mean value of the AC power signal near a predetermined level.

Further, the exact level of the error signal 402 is a function of the reference signal 404; accordingly, by decreasing a sampled scaled ouput voltage with the variable resistor R52, the mean value of the voltage across the transformer output coils 346 can be varied as necessary to obtain the desired AC power signal.

Referring for a moment back to FIG. 17A, the short circuit detecting circuit 364 and soft start circuit 372 will be discussed in further detail. Resistors R45 and R46, capacitor C23, and diodes D3 and D4 form a output voltage mean value circuit 412 that generates a DC signal corresponding to the mean value of the voltage across the transformer output coils 346. A comparator circuit 414 formed by a differential amplifier 416, resistors R41, R37, R40, R39, R44, and capacitor C22 compares the mean value signal generated by the mean value circuit 412 with a reference signal generated by the reference signal generating circuit 368 discussed above. Transistor Q6, resistors R54 and R35, and diode 418 form a circuit that brings to 12V the node between the resistor R35 and the diode 418 when the transistor Q6 is turned off.

The soft start circuit 372 comprises a capacitor C17, resistor R21, and diode D13. When the transistor Q6 of the short circuit detecting circuit 364 is turned on, the capacitor C17 is discharged, which brings the ferro duty cycle signal to 100% and thereby pulls the AC power signal to a low level.

The transistor Q6 is turned on when the mean value of the voltage across the transformer output windings 346 drops below a predetermined level, indicating a short circuit. In particular, when the output voltage mean value signal drops below the reference signal, the output of the comparator goes LOW. This LOW signal is ORed with another signal generated by a current transformer in the input side 312 through a conductor 420 to ensure system start-up stability under other conditions. This HIGH signal also turns on the transistor Q6.

When the short circuit condition is removed, the capacitor C17 must charge before the ferro duty cycle signal can be brought down from 100% duty cycle. Accordingly, the capacitor C17 delays resumed operation of the control circuit 334a to allow the system to stablize.

Figure 19B:
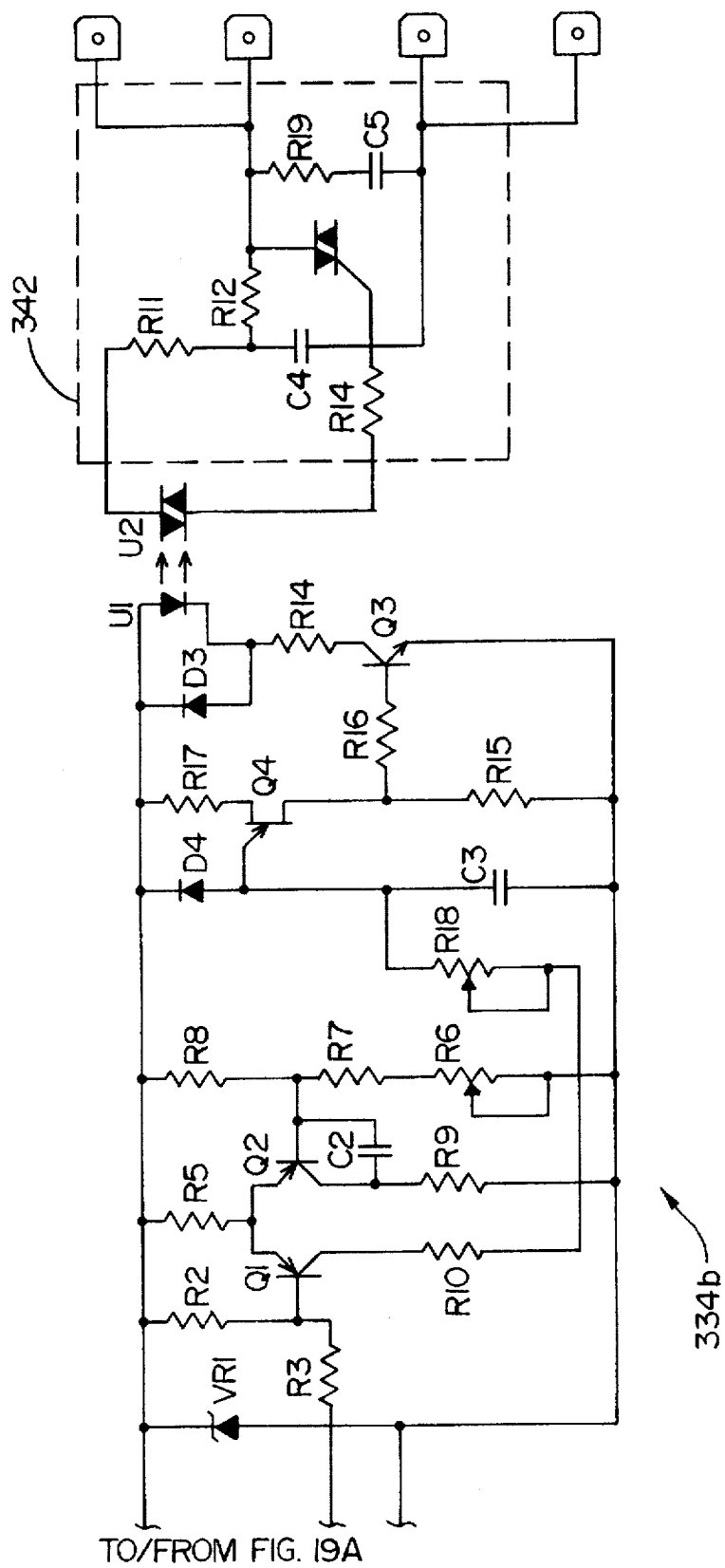

Referring now to FIGS. 19a and 19b, depicted therein is another exemplary output control circuit identified by reference character 334b. This circuit 334b operates in the following manner. The AC power signal is full-wave rectified by a diode bridge 510. The mean value of this rectified signal is generated by the resistor 512, capacitor 514, and diode D2. Transistors Q1 and Q2 with their associated scaling resistors R3, R2, R5, R10, and R9 and stabilizing capacitor C2 form an error circuit that generates an error current through resistor R10 based on a reference voltage generated by resistors R6, R7, and R8. The value of variable resistor R18 and scaling resistor R10 determined the level at which the capacitor C3 is discharged.

The error current charges a capacitor C3 up to a predetermined level, at which point a transistor Q4 discharges the capacitor C3. The value of variable resistor R18, the scaling resistor R10, and the characteristics of the transistor Q4 determine the rate at which the capacitor C3 is charged.

A transistor Q3 allows current to flow through a photo-diode U1 between the time the capacitor C3 discharges and the next point in time at which the voltage between rails X1 and X2 becomes zero. Resistor R16 is a current limiting resistor. Resistor R14 defines the current through the photo-diode U1.

Thus, the photo-diode U1 generates a light pulse when the transistor Q4 discharges the capacitor C3.

The speed at which the capacitor C3 charges is a function of the magnitude of the error current, so with larger error current, the capacitor C3 charges to the predetermined level more quickly. Thus, the location of one pulse relative to the next zero crossing varies according to the error current.

Figure 17B:
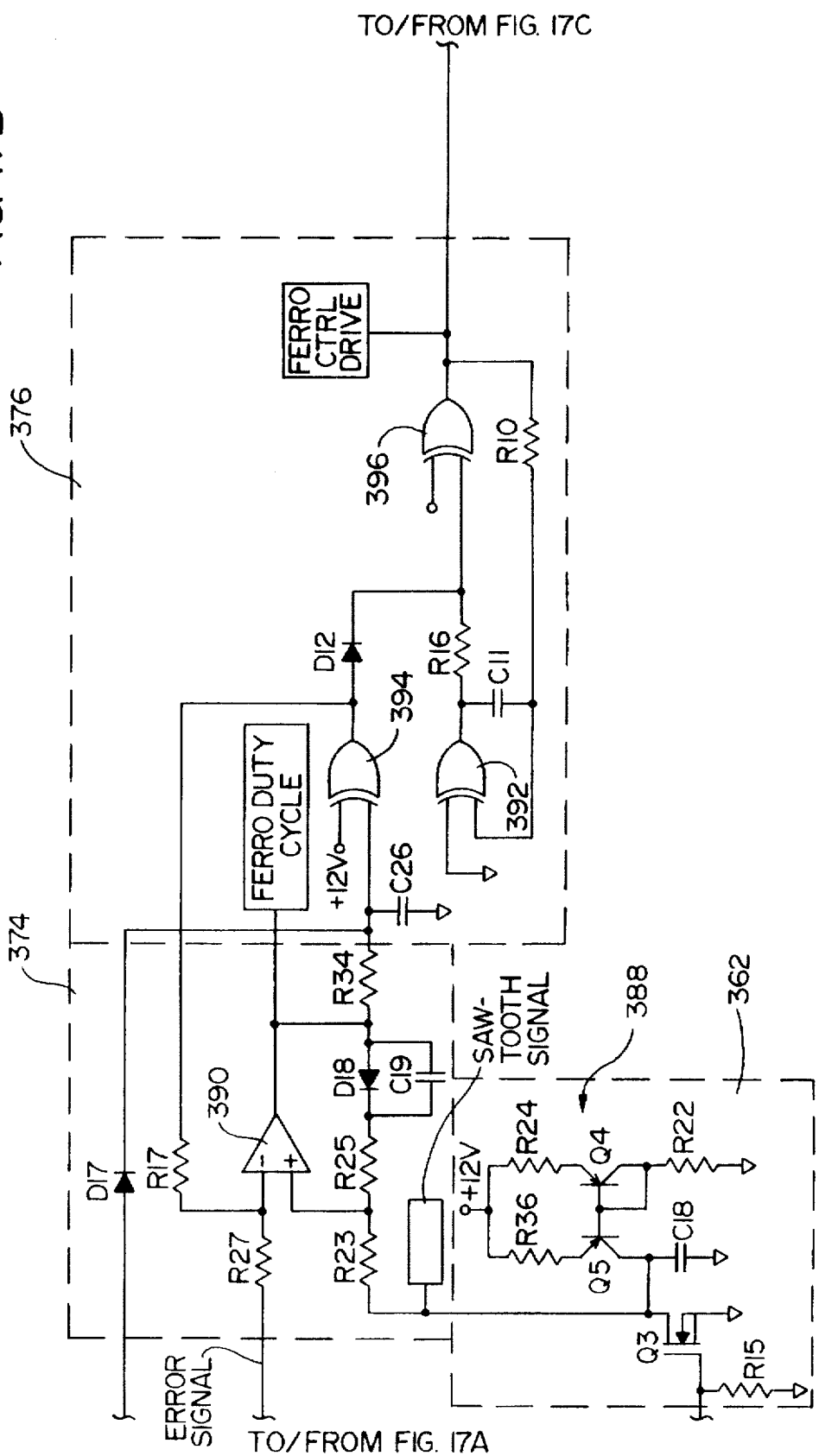
Figure 17C:
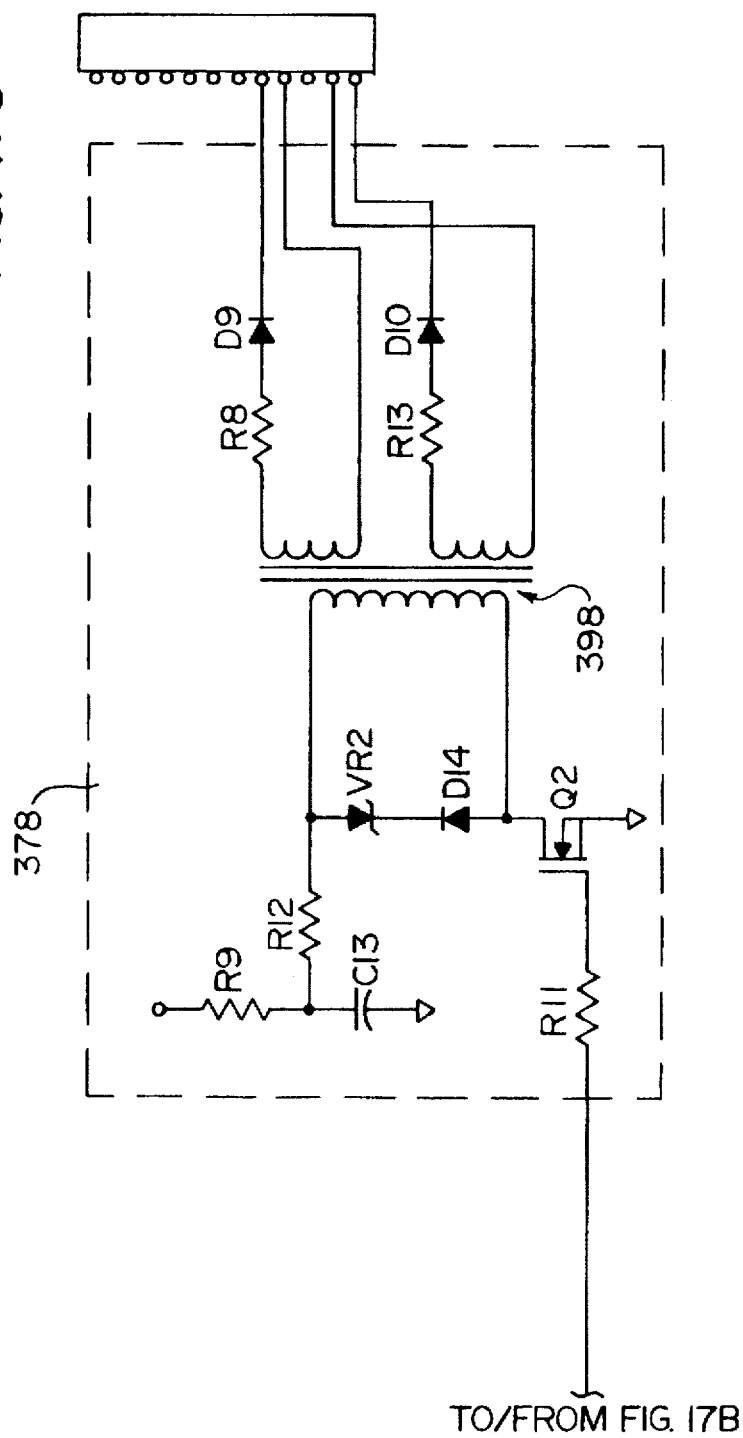

The light pulses generated by the photo-diode U are recieved by a photo-detector U2 to provide isolation similar to that provided by the transformer 398 of the exemplary control circuit 344a. The output of the photo-detector U2 opens and closes the AC switch 342 to control the current through the resonnant capacitor 338 as generally described above. An exemplary AC switch 342 shown in FIG. 17B is formed by an SCR CR1 and its associated resistors R11, R12, R13, and R19 and capacitors C4 and C5.

The invention disclosed and claimed herein may be embodied in specific forms other than described above without departing from the spirit or essential characteristics thereof. The discussion presented above is therefore to be considered in all respects as illustrative and not restrictive. The scope of the invention is indicated by the appended claims rather than the foregoing description. All changes which come within the meaning and range of equivalency of the claims are intended to be embraced therein.

We claim:

1. A power supply that generates an uninterruptible AC power signal for powering line extending amplifiers spaced along a distribution cable of a communication network, comprising:

line input means operatively connected to a utility power source;

output means operatively connected to the distribution cable;

inverter means operatively connected to a DC power source for generating a standby power signal comprising (a) a positive half-cycle comprising a leading portion, a middle portion, and a trailing portion and (b) a negative half-cycle having a leading portion, a middle portion, and a trailing portion, the inverter means comprising a switch array for generating a pulsed power signal from the DC power source;

control means for controlling the standby power signal such that a waveform shape of the standby power signal is within a set of predetermined parameters defined by characteristics of components of the communications network, the control means comprising an inductor and switch electrically connected to a resonant capacitor and drive means for operating the switch based on an error signal to change an effective capacitance of the resonant capacitor by allowing current to flow through the inductor rather than the resonant capacitor to control a charging rate of the resonant capacitor, resulting in the waveform shape of the AC power signal being within the set of predetermined parameters; and selecting means for connecting the line input means to the output means such that a line power signal generated by the utility power source forms the AC power signal under normal operation and connecting the inverter means to the output means such that the standby power signal forms the AC power signal when a fault occurs in the utility power source, the selecting means comprising a ferroresonant transformer having input windings and output windings, means for connecting the switch array to the input windings of the ferroresonant transformer, and the capacitor where the resonant capacitor is connected across the output windings of the ferroresonant transformer.

2. A power supply as recited in claim 1, in which:

the inductor and the switch are connected in series with each other and in parallel with the resonant capacitor across the output windings of the ferroresonant transformer.

3. A power supply as recited in claim 2, further comprising:

means for developing a mean value signal indicative of a mean value of the AC power signal; and means for generating the error signal based on a difference between the mean value signal and a predetermined reference signal.

4. A power supply as recited in claim 3, further comprising:

means for generating a ferro drive control signal based on the error signal, where the ferro drive control signal comprises bursts of high frequency pulses; and means for opening and closing the switch based on the ferro drive control signal.

5. A power supply as recited in claim 4, further comprising:

means for generating a sawtooth waveform signal that returns to zero whenever the AC power signal crosses zero;

means for generating a ferro duty cycle signal based on a difference between the error signal and the sawtooth waveform signal; and means for generating the ferro drive control signal based on the ferro duty cycle signal.

6. A power supply as recited in claim 5, in which the means for generating the ferro drive control signal comprises:

means for generating a high frequency carrier signal; and means for modulating the high frequency carrier signal with the ferro duty cycle signal to obtain the ferro drive control signal.

7. A power supply as recited in claim 1, in which:

the control signal comprises a series of pulses the widths of which are varied based on a desired power signal waveform shape defined by the set of predetermined parameters; and the inverter means comprises switch means for generating, based on a DC power signal, a pulsed power signal corresponding to the control signal; and the selecting means comprises filter means for filtering the pulsed power signal to obtain the standby power signal.

8. A power supply as recited in claim 7, in which control means further comprises:

means for generating a reference signal having a waveform shape corresponding at least in part to the desired power signal waveform shape;

means for generating a sawtooth waveform signal; and means for generating the control signal based on a comparison of the reference signal with the sawtooth waveform signal.

9. A power supply as recited in claim 8, further comprising:

means for generating a plurality of drive signals based on the control signal; and means for applying the drive signals to the switch circuit.

10. A power supply as recited in claim 9, further comprising:

means for selecting every other cycle of the control signal to obtain a first drive signal; and means for inverting each non-selected cycle of the control signal to obtain a second drive signal.

11. A power supply that generates an uninterruptible AC power signal for powering line extending amplifiers spaced along a distribution cable of a communications network, comprising:

line input means operatively connected to a utility power source;

output means operatively connected to the distribution cable;

inverter means operatively connected to a DC power source for generating a standby power signal comprising (a) a positive half-cycle comprising a leading portion, a middle portion, and a trailing portion and (b) a negative half-cycle having a leading portion, a middle portion, and a trailing portion;

control means for controlling the standby power signal such that a waveform shape of the standby power signal is within a set of predetermined parameters defined by characteristics of components of the communications network, the control means comprising:

an inductor and switch electrically connected to a resonant capacitor; and drive means for operating the switch based on an error signal to change an effective capacitance of the resonant capacitor by allowing current to flow through the inductor rather than the resonant capacitor to control a charging rate of the resonant capacitor, resulting in the waveform shape of the AC power signal being within the set of predetermined parameters; and selecting means for connecting the line input means to the output means such that a line power signal generated by the utility power source forms the AC power signal under normal operation and connecting the inverter means to the output means such that the standby power signal forms the AC power signal when a fault occurs in the utility power source.

12. A power supply as recited in claim 11, in which the inverter means comprises a switch array for generating a pulsed power signal from the DC power source.

13. A power supply as recited in claim 11, in which the inductor and the switch are connected in series with each other and in parallel with the resonant capacitor across the output windings of the ferroresonant transformer.

14. A power supply as recited in claim 11, further comprising:

means for developing a mean value signal indicative of a mean value of the AC power signal; and means for generating the error signal based on a difference between the mean value signal and a predetermined reference signal.

15. A power supply as recited in claim 12, further comprising:

means for generating a ferro drive control signal based on the error signal, where the ferro drive control signal comprises bursts of high frequency pulses; and means for opening and closing the switch based on the ferro drive control signal.

16. A power supply as recited in claim 13, further comprising:

means for generating a sawtooth waveform signal that returns to zero whenever the AC power signal crosses zero;

means for generating a ferro duty cycle signal based on a difference between the error signal and the sawtooth waveform signal; and means for generating the ferro drive control signal based on the ferro duty cycle signal.

17. A power supply as recited in claim 14, in which the means for generating the ferro drive control signal comprises:

means for generating a high frequency carrier signal; and means for modulating the high frequency carrier signal with the ferro duty cycle signal to obtain the ferro drive control signal.

18. A power supply as recited in claim 11, in which:

the control signal comprises a series of pulses the widths of which are varied based on a desired power signal waveform shape defined by the set of predetermined parameters;

the inverter means comprises switch means for generating, based on a DC power signal, a pulsed power signal corresponding to the control signal; and the selecting means comprises filter means for filtering the pulsed power signal to obtain the standby power signal.

19. A power supply as recited in claim 16, in which control means further comprises:

means for generating a reference signal having a waveform shape corresponding at least in part to the desired power signal waveform shape;

means for generating a sawtooth waveform signal; and means for generating the control signal based on a comparison of the reference signal with the sawtooth waveform signal.

20. A power supply as recited in claim 16, further comprising:

means for generating a plurality of drive signals based on the control signal; and means for applying the drive signals to the switch circuit.

21. A power supply as recited in claim 18, further comprising:

means for selecting every other cycle of the control signal to obtain a first drive signal; and means for inverting each non-selected cycle of the control signal to obtain a second drive signal.

22. A power supply than generates an uninterruptible AC power signal for powering line extending amplifiers spaced along a distribution cable of a communications network, comprising:

line input means operatively connected to a utility power source;

output means operatively connected to the distribution cable;

inverter means operatively connected to a DC power source for generating a standby power signal comprising (a) a positive half-cycle comprising a leading portion, a middle portion, and a trailing portion and (b) a negative half-cycle having a leading portion, a middle portion, and a trailing portion, the inverter means comprising a switch array for generating a pulsed power signal from the DC power source;

control means for controlling the standby power signal such that a waveform shape of the standby power signal is within a set of predetermined parameters defined by characteristics of components of the communications network; and selecting means for connecting the line input means to the output means such that a line power signal generated by the utility power source forms the AC power signal under normal operation and connecting the inverter means to the output means such that the standby power signal forms the AC power signal when a fault occurs in the utility power source, the selecting means comprises a ferroresonant transformer having input windings and output windings, means for connecting the switch array to the input windings of the ferroresonant transformer, and a resonant capacitor connected across the output windings of the ferroresonant transformer, wherein the control means comprises an inductor and switch, where operation of the switch based on a control signal changes an effective capacitance of the resonant capacitor such that the waveform shape of the AC power signal is within the set of predetermined parameters;

the inductor and the switch are connected in series with each other and in parallel with the resonant capacitor across the output windings of the ferroresonant transformer; and the control means further comprises drive means for operating the switch based on an error signal to allow current to flow through the inductor rather than the resonant capacitor to control a charging rate of the resonant capacitor.

23. A power supply as recited in claim 20, further comprising:

means for developing a mean value signal indicative of a mean value of the AC power signal; and means for generating the error signal based on a difference between the mean value signal and a predetermined reference signal.

24. A power supply as recited in claim 21, further comprising:

means for generating a ferro drive control signal based on the error signal, where the ferro drive control signal comprises bursts of high frequency pulses; and means for opening and closing the switch based on the ferro drive control signal.

25. A power supply as recited in claim 22, further comprising:

means for generating a sawtooth waveform signal that returns to zero whenever the AC power signal crosses zero;

means for generating a ferro duty cycle signal based on a difference between the error signal and the sawtooth waveform signal; and means for generating the ferro drive control signal based on the ferro duty cycle signal.

26. A power supply as recited in claim 23, in which the means for generating the ferro drive control signal comprises:

means for generating a high frequency carrier signal; and means for modulating the high frequency carrier signal with the ferro duty cycle signal to obtain the ferro drive control signal.

27. A power supply as recited in claim 20, in which:

the control signal comprises a series of pulses the widths of which are varied based on a desired power signal waveform shape defined by the set of predetermined parameters; and the inverter means comprises switch means for generating, based on a DC power signal, a pulsed power signal corresponding to the control signal; and the selecting means comprises filter means for filtering the pulsed power signal to obtain the standby power signal.

28. A power supply as recited in claim 25, in which control means further comprises:

means for generating a reference signal having a waveform shape corresponding at least in part to the desired power signal waveform shape;

means for generating a sawtooth waveform signal; and means for generating the control signal based on a comparison of the reference signal with the sawtooth waveform signal.

29. A power supply as recited in claim 26, further comprising:

means for generating a plurality of drive signals based on the control signal; and means for applying the drive signals to the switch circuit.

30. A power supply as recited in claim 27, further comprising:

means for selecting every other cycle of the control signal to obtain a first drive signal; and means for inverting each non-selected cycle of the control signal to obtain a second drive signal.

* * * * *